(12) United States Patent
Rose

(10) Patent No.: US 10,409,556 B2
(45) Date of Patent: Sep. 10, 2019

(54) DIVISION SYNTHESIS

(71) Applicant: Imagination Technologies Limited, Kings Langley (GB)

(72) Inventor: Thomas Rose, Watford (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

(21) Appl. No.: 15/797,020

(22) Filed: Oct. 30, 2017

(65) Prior Publication Data

US 2018/0121166 A1    May 3, 2018

(30) Foreign Application Priority Data

Oct. 28, 2016 (GB) .................................. 1618286.7

(51) Int. Cl.
*G06F 7/535* (2006.01)
*G06F 7/499* (2006.01)
*G06F 7/72* (2006.01)

(52) U.S. Cl.
CPC .......... *G06F 7/535* (2013.01); *G06F 7/49931* (2013.01); *G06F 7/727* (2013.01); *G06F 2207/5354* (2013.01); *G06F 2207/5356* (2013.01)

(58) Field of Classification Search
None
See application file for complete search history.

(56) References Cited

U.S. PATENT DOCUMENTS

| 5,012,439 | A | * | 4/1991 | Nash | ....................... | G06F 7/535 |
| | | | | | | 708/493 |
| 2002/0116679 | A1 | | 8/2002 | Lei et al. | | |
| 2003/0131035 | A1 | * | 7/2003 | Kurd | ....................... | G06F 7/535 |
| | | | | | | 708/504 |
| 2003/0149713 | A1 | * | 8/2003 | Kurd | ....................... | G06F 7/535 |
| | | | | | | 708/650 |

(Continued)

FOREIGN PATENT DOCUMENTS

GB       868840 B       5/1961

OTHER PUBLICATIONS

Petry et al; "Division Techniques Integers of the Form 2N 1"; International Journal of Electronics, Taylor and Francis. Ltd. London, GB; vol. 74; No. 5; May 1, 1993; pp. 659-670.

(Continued)

*Primary Examiner* — David H Malzahn
(74) *Attorney, Agent, or Firm* — Vorys, Sater, Seymour and Pease LLP; Vincent M DeLuca

(57) ABSTRACT

A binary logic circuit for determining the ratio x/d in accordance with a rounding scheme, where x is a variable integer input of bit length w and d is a fixed positive integer of the form $2^n \pm 1$, the binary logic circuit being configured to form the ratio as a plurality of bit slices, the bit slices collectively representing the ratio, wherein the binary logic circuit is configured to generate each bit slice according to a first modulo operation for calculating $\mod(2^n \pm 1)$ of a respective bit selection of the input x and in dependence on a check for a carry bit, wherein the binary logic circuit is configured to, responsive to the check, selectively combine a carry bit with the result of the first modulo operation.

20 Claims, 9 Drawing Sheets

(56) References Cited

U.S. PATENT DOCUMENTS

2018/0121166 A1* 5/2018 Rose ................ G06F 7/49931

OTHER PUBLICATIONS

Artzy et al; "A Fast Division Technique for Constant Divisors" Communications of the ACM, Association for Computing Machinery, Inc, United States; vol. 19; No. 2; Feb. 1, 1976; pp. 98-101.
Srinivasan et al; "Constant-Division Algorithms"; IEE Proceedings: Computers and Digital Techniq, IEE, GB; vol. 141; No. 6; Nov. 1, 1994; pp. 334-340.
Sivakumar et al., "VSLI Design of a Modulo-Extractor," University of Victoria, Electrical and Computer Engineering, IEEE Pacific Rim Conference, May 1991.

* cited by examiner

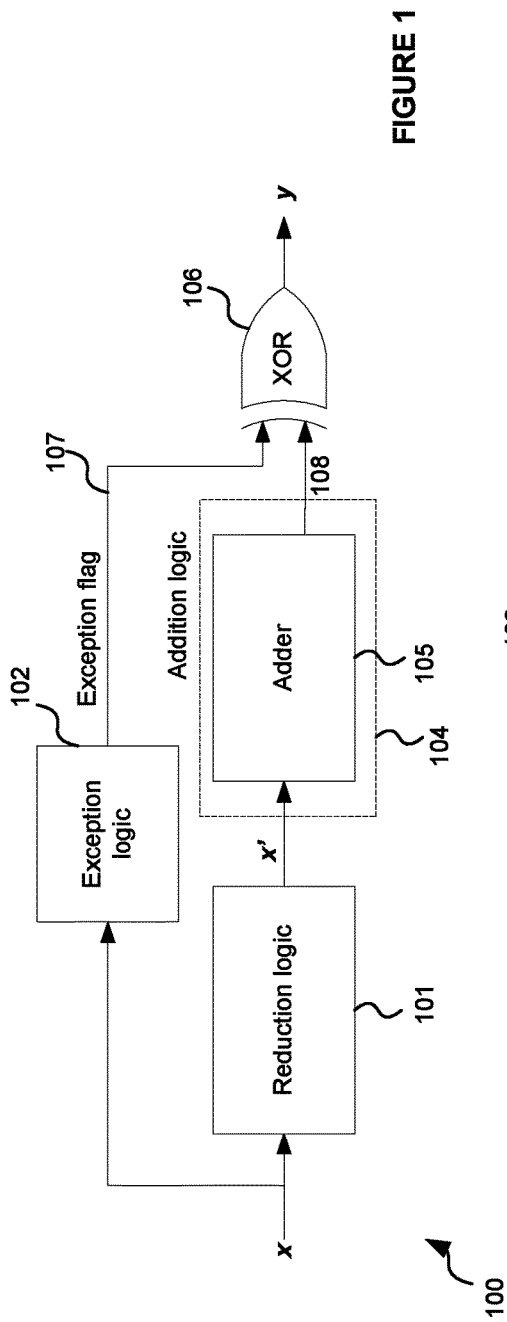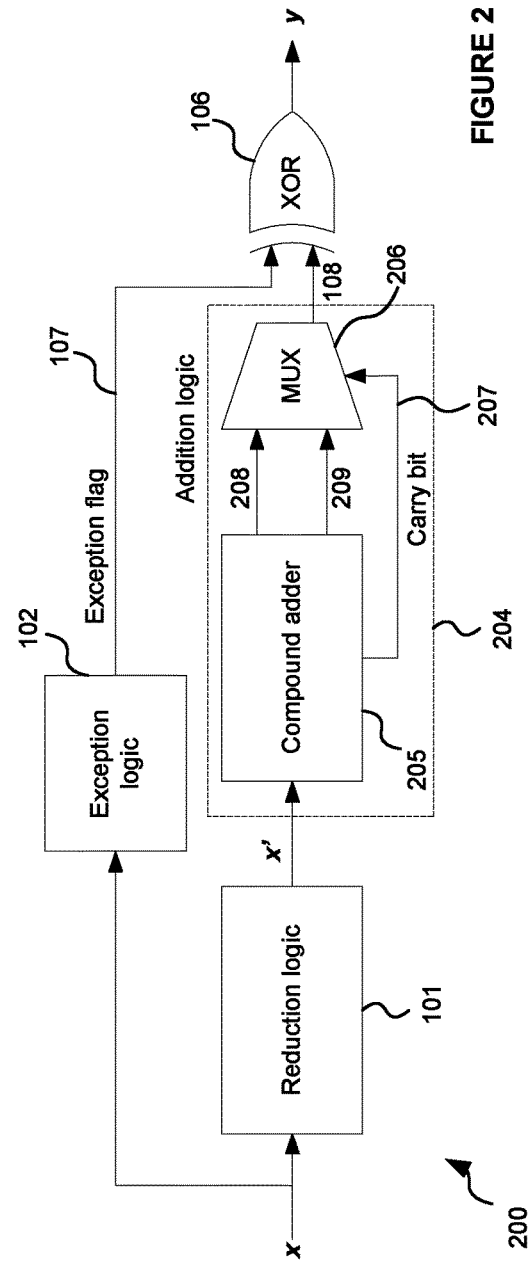

Exception flag

DIVISION SYNTHESIS

BACKGROUND OF THE INVENTION

This invention relates to a binary logic circuit for determining a ratio $$div = \frac{x}{d},$$

particularly for the case in which x is an unsigned variable integer and d is a positive integer constant of the form $2^n \pm 1$.

It is a common requirement in digital circuits that hardware is provided for calculating a ratio $$\frac{x}{d}$$

for some input x, where d is some constant known at design time. Such calculations are frequently performed and it is important to be able to perform them as quickly as possible in digital logic so as to not introduce delay into the critical path of the circuit.

Binary logic circuits for calculating a ratio $$\frac{x}{d}$$

are well known. For example, circuit design is often performed using tools which generate circuit designs at the register-transfer level (RTL) from libraries of logic units which would typically include a logic unit for calculating a ratio $$\frac{x}{d}.$$

Such standard logic units will rarely represent the most efficient logic for calculating $$\frac{x}{d}$$

in terms of circuit area consumed or the amount of delay introduced into the critical path.

Conventional logic for calculating a ratio $$\frac{x}{d}$$

typically operates in one of two ways. A first approach is to evaluate the ratio according to a process of long division. This approach can be relatively efficient in terms of silicon area consumption but requires w−n+1 sequential operations which introduce considerable latency, where w is the bit length of x. A second approach is to evaluate the ratio by multiplying the input variable x by a reciprocal:

$$\frac{x}{2^n - 1} = x \cdot \frac{1}{2^n - 1} = x \cdot c \quad (1)$$

Thus the division of variable x by $2^n-1$ may be performed using conventional binary multiplier logic arranged to multiply the variable x by a constant c evaluated at design time. This approach can offer low latency but requires a large silicon area.

BRIEF SUMMARY OF THE INVENTION

According to a first aspect of the present invention there is provided a binary logic circuit for determining the ratio x/d in accordance with a rounding scheme, where x is a variable integer input of bit length w and d is a fixed positive integer of the form $2^n \pm 1$, the binary logic circuit being configured to form the ratio as a plurality of bit slices, the bit slices collectively representing the ratio, wherein the binary logic circuit is configured to generate each bit slice according to a first modulo operation for calculating $mod(2^n \pm 1)$ of a respective bit selection of the input x and in dependence on a check for a carry bit, wherein the binary logic circuit is configured to, responsive to the check, selectively combine a carry bit with the result of the first modulo operation.

The binary logic circuit may be configured to generate each bit slice i of the ratio by performing the first modulo operation $x[w-1:n*(i+1)]mod(2^n-1)$, where i lies in the range 0 to $$\lceil \frac{w}{n} \rceil - 1.$$

The binary logic circuit may be configured to, for each bit slice i, perform the check for a carry bit by:

in the case $d=2^n-1$, returning a carry bit of 1 for combination with the result of the first modulo operation when:

$$x[w-1:n*(i+1)]mod(2^n-1)+x[n*(i+1)-1:n*i] \geq 2^n-1$$

or in the case $d=2^n+1$, returning a carry bit of −1 for combination with the result of the first modulo operation when:

$$-x[w-1:n*(i+1)]mod(2^n+1)+x[n*(i+1)-1:n*i] \geq 0.$$

The binary logic circuit may be configured to not combine a carry bit with the result of the first modulo operation in the event that the relevant condition is not satisfied.

For a given bit slice i, the check for the carry bit may use the result of the first modulo operation for $mod(2^n \pm 1)$ of the respective bit selection of the input x.

The binary logic circuit may comprise a plurality of modulo logic units each configured to perform a first modulo operation on a different respective bit selection of the input x so as to generate a set of modulo outputs.

The modulo outputs from at least one of the modulo logic units may be used to generate more than one bit slice of the ratio.

A plurality of the modulo logic units may be configured to operate in parallel.

A majority of the modulo logic units may be configured to operate in parallel.

The binary logic circuit comprises combination logic may be configured to combine the set of modulo outputs so as to generate the bit slices of the ratio.

The combination logic may be an adder tree.

The combination logic may be configured to, for each bit slice i, perform the check for a carry bit.

The modulo outputs may be d-bit one-hot encodings.

The binary logic circuit may comprise an adder tree configured to determine the result of one or more of the first modulo operations by combining the results of first modulo operations on shorter bit selections from x to form the results of first modulo operations on longer bit selections from x, the binary logic circuit not including logic to evaluate those first modulo operations on longer bit selections from x.

The logic elements of the adder tree may comprise only AND and OR gates.

In the case $d=2^n-1$, the binary logic circuit may comprise a plurality of full adders each configured to perform, for a given bit slice i, the first modulo operation $x[w-1:n*(i+1)] \mod(2^n-1)$ and each full adder comprising:
 reduction logic configured to reduce the respective bit selection of the input x to a sum of a first n-bit integer $\beta$ and a second n-bit integer $\gamma y$; and
 addition logic configured to calculate an addition output represented by the n least significant bits of the following sum right-shifted by n:
  a first binary value of length 2 n, the n most significant bits and the n least significant bits each being the string of bit values represented by $\beta$;
  a second binary value of length 2 n, the n most significant bits and the n least significant bits each being the string of bit values represented by $\gamma$; and the binary value 1.

The plurality of full adders may be arranged in a logic tree configured so as to generate each bit slice i of the ratio.

The reduction logic may be configured to interpret the bit selection of x as a sum of n-bit rows x', each row representing n consecutive bits of the bit selection of x such that each bit of the bit selection of x contributes to only one row and all of the bits of x are allocated to a row, and the reduction logic is configured to reduce the sum of such n-bit rows x' in a series of reduction steps so as to generate the sum of the first n-bit integer $\beta$ and the second n-bit integer $\gamma$.

Each reduction step may comprise summing a plurality of the n-bit rows of x' so as to generate a sum of one or more fewer n-bit rows.

The reduction logic may be configured to, on a reduction step generating a carry bit for a row at binary position n+1, use the carry bit as the least significant bit of the row.

The reduction logic may comprise one or more reduction cells each configured to sum a plurality of the n-bit rows of x' so as to generate a sum of one or more fewer n-bit rows.

The reduction logic may comprise a plurality of reduction cells and the plurality of reduction cells may be configured to operate in parallel on the rows of x' at each reduction step.

The length of the bit selection from input x for bit slice i may be $v_i$ and the reduction logic may comprise at least $$\lfloor \lceil \tfrac{v_i}{n} \rceil / 3 \rfloor$$

reduction cells each operating on a different set of three rows of x' such that, at each reduction step, the number of rows is reduced by approximately a third.

The reduction logic may comprise a plurality of reduction stages coupled together in series, each reduction stage comprising one or more reduction cells configured to operate in parallel so as to perform a reduction step.

The reduction logic may comprise a number of reduction stages equal to the number of reduction steps required to reduce the sum of n-bit rows x' to the sum of n-bit integers $\beta$ and $\gamma$.

The reduction logic may be configured to iteratively operate the one or more reduction cells over the rows of x' until two rows remain which represent n-bit integers $\beta$ and $\gamma$.

The binary logic circuit may further comprise:
 exception logic configured to form a determination result indicating whether all of the bits of the bit selection of x are 1; and
 output logic configured to operate on the addition output in dependence on the determination result received from the exception logic;
 wherein the output logic is configured to, if the determination result indicates that all of the bits of the bit selection of x are 1, perform a XOR operation of the addition output with the binary value 1.

The exception logic may be configured to form a determination result of 1 if all of the bits of the bit selection of x are 1 and a determination result of 0 if not all of the bits of the bit selection of x are 1, and the output logic comprising a XOR gate configured to receive the addition output and determination result as its inputs so as to form as its output the result of the first modulo operation.

The addition logic may comprise a compound adder configured to concurrently form a first sum $\beta+\gamma$ and a second sum $\beta+\gamma+1$, and to provide the sums to a multiplexer configured to select between the first and second sums in dependence on whether the second sum generates a carry bit; the addition output of the multiplexer being the second sum if a carry bit is generated and the first sum if a carry bit is not generated.

The addition logic may comprise an adder configured to calculate the sum of the first and second binary values and 1, and the addition logic being configured to provide the n least significant bits of the sum right-shifted by n as the addition output.

In the case $d=2^n+1$, the binary logic circuit may comprise groups of one or more full adders, each group configured to perform, for a given bit slice i, the first modulo operation $x[m-1:i*n]\mod(2^n+1)$ where $$m = \lceil \tfrac{w}{n} \rceil,$$

each full adder of a group comprising:
 reduction logic configured to reduce a set of three adjacent input bit strings of length n to a set of two output bit strings of length n, the bit strings being assigned alternating signs such that the adjacent bit strings have opposite signs and in dependence on a first bit string comprising the least significant bits of x being assigned a positive sign;
 carry logic configured to logically negate a carry bit generated at position n by the reduction logic and include the carry bit at an empty position 0 in the set of two output bit strings; and
 addition logic configured to:
  if the three input bit strings include two positive bit strings and one negative bit string, add binary minus 1 to the output bit strings; and if the three input bit strings include two positive bit strings and one negative bit string, add binary plus 1 to the output bit strings.

The binary logic circuit may be configured to generate bit slices of length n.

According to a second aspect there is provided a method for determining the ratio x/d in a binary logic circuit in accordance with a rounding scheme, where x is a variable integer input of bit length w and d is a fixed positive integer of the form $2^n \pm 1$, the method comprising:

forming each of a plurality of bit slices of the ratio by:
performing a first modulo operation for calculating mod($2^n \pm 1$) of a respective bit selection of the input x;
checking for a carry bit of the first modulo operation; and
responsive to the check, selectively combining the carry bit with the result of the first modulo operation; and combining the bit slices to form the complete ratio.

The result of each first modulo operation may be a d-bit one-hot encoding.

The result of one or more of the first modulo operations may be determined by combining the results of first modulo operations on shorter bit selections from x to form the results of first modulo operations on longer bit selections from x.

The performing a first modulo operation may comprise:
reducing the bit selection of x to a sum of a first n-bit integer $\beta$ and a second n-bit integer $\gamma$;
at least partially calculating a result for the sum of:
a first binary value of length 2n, the n most significant bits and the n least significant bits each being the string of bit values represented by $\beta$;
a second binary value of length 2n, the n most significant bits and the n least significant bits each being the string of bit values represented by $\gamma$; and
the binary value 1;
and
using the n least significant bits of the result right-shifted by n as the result of the first modulo operation.

The binary logic circuit may be embodied in hardware on an integrated circuit. There may be provided a method of manufacturing, at an integrated circuit manufacturing system, the binary logic circuit. There may be provided an integrated circuit definition dataset that, when processed in an integrated circuit manufacturing system, configures the system to manufacture the binary logic circuit. There may be provided a non-transitory computer readable storage medium having stored thereon a computer readable description of an integrated circuit that, when processed in an integrated circuit manufacturing system, causes the integrated circuit manufacturing system to manufacture the binary logic circuit.

There may be provided an integrated circuit manufacturing system comprising:
a non-transitory computer readable storage medium having stored thereon a computer readable integrated circuit description that describes the binary logic circuit;
a layout processing system configured to process the integrated circuit description so as to generate a circuit layout description of an integrated circuit embodying the binary logic circuit; and
an integrated circuit generation system configured to manufacture the binary logic circuit according to the circuit layout description.

There may be provided computer program code for performing methods as described herein. There may be provided non-transitory computer readable storage medium having stored thereon computer readable instructions that, when executed at a computer system, cause the computer system to perform the methods as described herein.

BRIEF DESCRIPTION OF THE DRAWINGS

The present invention will now be described by way of example with reference to the accompanying drawings. In the drawings:

FIG. 1 is a schematic diagram of a first binary logic circuit for a full adder.

FIG. 2 is a schematic diagram of a second binary logic circuit for a full adder.

DETAILED DESCRIPTION OF THE INVENTION

The following description is presented by way of example to enable a person skilled in the art to make and use the invention. The present invention is not limited to the embodiments described herein and various modifications to the disclosed embodiments will be apparent to those skilled in the art.

Examples described herein provide an improved binary logic circuit for calculating a ratio $$div = \frac{x}{d}$$

where x is a variable input and d is a fixed integer divisor. In the examples described herein, x is an unsigned variable integer input of known length w bits, d is a positive integer divisor of the form $2^n \pm 1$, div is the output which has q bits. It will be appreciated that the principles disclosed herein are not limited to the particular examples described herein and can be extended using techniques known in the art of binary logic circuit design to, for example, signed inputs x, rounding schemes other than round to negative infinity, and divisors of related forms. For example, division by a divisor of the form $d=2P(2^n \pm 1)$ may be readily accommodated by right-shifting x by p before performing division by $2^n \pm 1$ according to the principles described herein.

Figure 5:
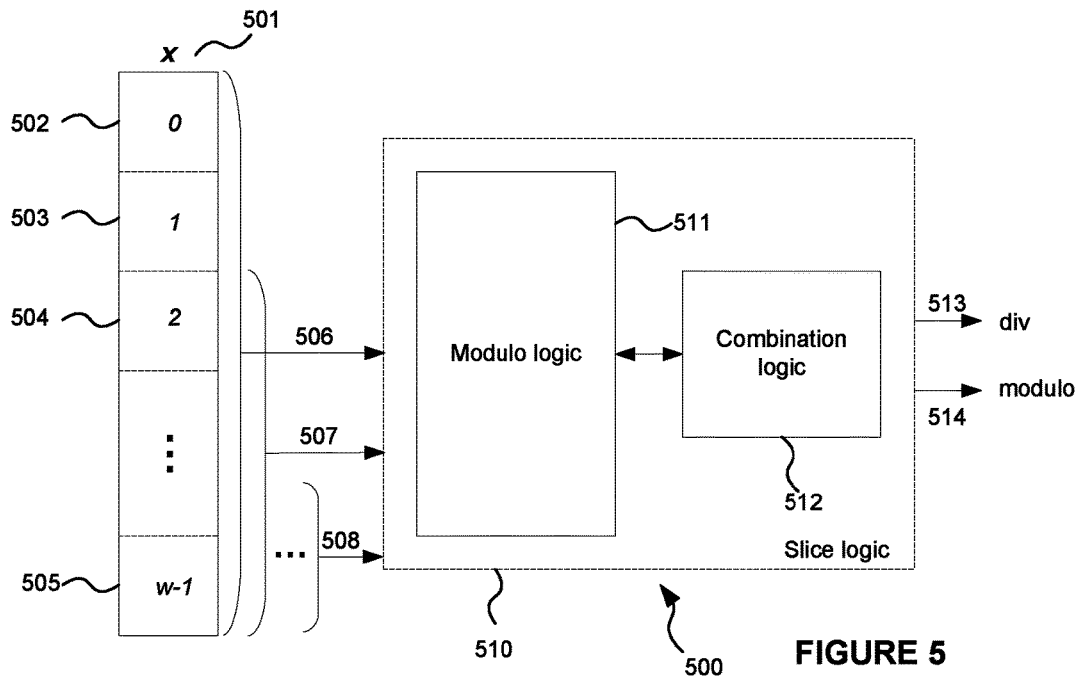
FIG. 5 is a schematic diagram of a binary logic circuit configured according to the present invention.

A binary logic circuit 500 for evaluating a ratio $$div = \frac{x}{d}$$

is shown in FIG. 5, where the divisor $d=2^n \pm 1$ and the input variable x is an unsigned integer having a bit range x[w−1: 0]. The circuit comprises a data store 501 (e.g. one or more registers) for holding the bits of input variable x, slice logic 510 for operating on portions of the input variable so as to generate n bit slices of the ratio div which collectively represent output 513, the complete binary ratio div. The binary logic circuit may additionally provide the modulo output 514 for the division operation $$div = \frac{x}{d}.$$

Data store 501 may comprise a register for each bit of the input variable, as is illustrated in FIG. 5 by registers 501-505. If the input variable is of bit length w there would in the present example be w registers. Other arrangements are possible. The binary logic circuit 500 is configured to operate on selections of bits from the input variable x. The bit selections from the input variable are represented by 506-508 in FIG. 5. The bit selections are determined at design time. For example, each register may be hardwired in the binary logic circuit so as to provide an appropriate selection of bits to slice logic 510. The bit selections and their use in calculations performed at the slice logic to generate bit slices of the output div will now be described.

The binary logic circuit 500 in the present example is configured to calculate:

$$div = \left\lfloor \frac{x}{d} \right\rfloor \quad (2)$$

The floor of the ratio x/d is calculated since rounding to negative infinity is being used.

The modulo output 514 of this division operation is therefore given by:

$$modulo = x - d^* div \quad (3)$$

Such that $0 \leq modulo \leq d-1$.

The present invention recognises that the division operation of equation (2) can be efficiently evaluated in a piecewise manner by calculating bit slices of length n of the ratio div from selections of bits of the input variable x. For a given n and known bit length w of the binary input x, the shortest bit length of the binary ratio div which can represent all possible outputs may be expressed as q:

$$q = \begin{cases} w - n + 1 & \text{if } d = 2^n - 1 \\ w - n & \text{if } d = 2^n + 1 \end{cases} \quad (4)$$

Bits n*i to q−1 of output ratio div may be expressed as follows in equations (5) below, where i is selected so as to generate the q bits of div. The maximum value of the index $$i_{max} = \left\lfloor \frac{q-1}{n} \right\rfloor = \begin{cases} \left\lfloor \frac{w}{n} \right\rfloor - 1 & \text{if } d = 2^n - 1 \\ \left\lfloor \frac{w-1}{n} \right\rfloor - 1 & \text{if } d = 2^n + 1 \end{cases}$$

For example, for a 16 bit binary input x (corresponding to w=16) and a divisor of 3 (corresponding to n=2 for a divisor of the form $d=2^n-1$), q is 15 and i will take the range [0, 7].

$$div[q-1:n*i] = \quad (5)$$

$$\left\lfloor \frac{x[w-1:n*i]}{2^n \pm 1} \right\rfloor = \left\lfloor \frac{2^n * x[w-1:n*(i+1)] + x[n*(i+1)-1:n*i]}{2^n \pm 1} \right\rfloor =$$

$$2^n * \left\lfloor \frac{x[w-1:n*(i+1)]}{2^n \pm 1} \right\rfloor +$$

$$\left\lfloor \frac{2^n * (x[w-1:n*(i+1)] \bmod(2^n \pm 1)) + x[n*(i+1)-1:n*i]}{2^n \pm 1} \right\rfloor =$$

$$2^n * \left\lfloor \frac{x[w-1:n*(i+1)]}{2^n \pm 1} \right\rfloor + (x[w-1:n*(i+1)] \bmod(2^n \pm 1)) +$$

$$\left\lfloor \frac{\mp (x[w-1:n*(i+1)] \bmod(2^n \pm 1)) + x[n*(i+1)-1:n*i]}{2^n \pm 1} \right\rfloor$$

Taking modulo $2^n$ to yield the least significant n bits gives an expression for the $i^{th}$ n bit slice of the output div:

$$div[n*(i+1)-1:n*i] := \quad (6)$$

$$div[q-1:n*i] \bmod 2^n = (x[w-1:n*(i+1)] \bmod(2^n \pm 1)) +$$

$$\left\lfloor \frac{\mp (x[w-1:n*(i+1)] \bmod(2^n \pm 1)) + x[n*(i+1)-1:n*i]}{2^n \pm 1} \right\rfloor$$

For the case $d=2^n-1$, equation (6) simplifies to the conditional equation:

$$div[n^*(i+1)-1:n^*i] = x[w-1:n^*(i+1)] \bmod(2^n-1) +?1:0 \quad (7)$$

Where the element +?1:0 indicates that a carry bit is added when the following condition is true and otherwise no carry bit (or zero) is added:

$$x[w-1:n^*(i+1)] \bmod(2^n-1) + x[n^*(i+1)-1:n^*i] \geq 2^n-1 \quad (8)$$

For the case $d=2^n+1$, equation (6) simplifies to the conditional equation:

$$div[n^*(i+1)-1:n^*i] = x[w-1:n^*(i+1)] \bmod(2^n+1)?1:0 \quad (9)$$

Where the element −?1:0 indicates that a negative carry bit is added when the following condition is true and otherwise no negative carry bit (or zero) is added:

$$x[w-1:n^*(i+1)]\bmod(2^n+1)+x[n^*(i+1)-1:n^*i]<0 \quad (10)$$

In this manner, a potentially complex division operation may be reduced to, for each value of i, performing modulo arithmetic on bit selections from the input variable x. Each modulo calculation performed in accordance with equation 7 or 9 represents an n bit slice of the desired output div. The collective output from the set of i modulo calculations therefore represent the complete q bit output div 513. The output 513 may be stored in one or more bit registers. Not all of the bits of output 513 need be available at the same time—for example, the n bit slices of div may be stored as and when they are generated by the slice logic until the complete q bit output div 513 is present at the registers.

The parameters d and w are known at design time such that the binary logic circuit may be configured as a fixed function hardware unit optimised to perform division by d. Any logic able to perform modulo arithmetic in accordance with equations 7 and 8 or 9 and 10 (as appropriate to the particular form of d) may be implemented at the slice logic 510.

The reduction of the division operation to a set of modulo calculations performed on portions of the input variable enables division operations to be performed at low latency while consuming limited area on a chip. The approach further offers substantial scope to optimise the binary logic circuit 500 to minimise latency and/or chip area consumption. Typically latency and chip area consumption are at least to some extent competing factors. The approach described herein allows a desired balance between them to be achieved.

The above approach enables substantial parallelization of a division operation. For example, multiple logic units may be provided at the slice logic so as to enable two or more (and possibly all) n bit slices of div to be generated in parallel. This enables very low latency to be achieved. The repetition in the modulo calculations performed in order to form the bit slices of div may alternatively or additionally be used to reduce the area consumed by the binary logic circuit. For example, instead of providing a logic unit for each instance of a given modulo calculation, fewer logic units (possibly one) can be provided than the number of instances of that calculation with the result of the calculation performed by a logic unit being used at multiple instances in the slice logic where that result is required.

The bit selections expressed in equations 7 to 10 above for each i are illustrated in FIG. 5 for the case n=2 by the bit ranges 506 to 508. For example:

To perform the modulo calculation for i=0, the bit range x[w−1:n] is required (i.e. all but the first 2 bits of x); the carry check requires that same bit range as well as x[n−1:0]. Thus, all bits of x are required by the slice logic to perform the modulo calculation for i=0. The relevant bit selection is illustrated by 506 in FIG. 5.

To perform the modulo calculation for i=1, the bit range x[w−1:2n] is required (i.e. all but the first 4 bits of x); the carry check requires that same bit range as well as x[2n−1:n]. Thus, all but the first 2 bits of x are required by the slice logic to perform the modulo calculation for i=1. The relevant bit selection is illustrated by 507 in FIG. 5.

To perform the modulo calculation for general i, the bit range x[w−1:n*(i+1)] is required (i.e. all but the first 2(i+1) bits of x); the carry check requires that same bit range as well as x[n*(i+1)−1:n*i]. Thus, all but the first 2i bits of x are required by the slice logic to perform the modulo calculation for general i. The relevant bit selection is illustrated by 508 in FIG. 5.

Continuing the example when n=2 for division by a divisor of the form d=$2^n$−1, if the length of the input variable x is w=16 bits then the length of the output div is, according to equation 4, q=15 bits. In this case, i takes the range [0, 7]. Thus the output div is formed in seven bit slices each of 2 bits and a single bit slice for the most significant bit div[14]. In this example binary logic circuit 500 is configured to perform division of a 16-bit input variable x by 3.

The slice logic may comprise modulo logic 511 and combination logic 512. The modulo logic is configured to perform modulo calculations of the form x[j:k]mod($2^n$±1). The modulo logic 511 may comprise a set of logic units each configured to perform a modulo calculation—in some examples, each such unit may be configured to perform a different one of the possible modulo calculations given the range of values of j and k. The combination logic 512 is configured to combine the outputs from the modulo calculations according to equations 7 and 8 or 9 and 10 (as appropriate to the form of d) so as to generate the bit slices of div and hence the complete output 513. The combination logic 512 may perform the addition of a carry bit to each bit slice in accordance with equations 8 & 10 and using the outputs of the modulo calculations performed at modulo logic 511. The processing by the modulo logic and combination logic need not be sequential. For example, the combination logic may be in the form of a logic tree within which the modulo logic is arranged. In some embodiments, the modulo logic and combination logic may be one and the same unit.

Any suitable logic for calculating the modulo of x/d may be used. For example, modulo output 514 may be calculated at the slice logic 510 from output div 513 according to equation 3. However, this approach introduces additional latency and consumes additional chip area. It is preferable that the modulo of the division operation x/d is calculated concurrently with div at the slice logic. This could be achieved, for example, by configuring the slice logic to calculate x[w−1:0]mod($2^n$±1)=modulo. A full adder configured in the manner described below could be used to calculate this result. More generally, any other suitable logic may be used, including, for example, logic configured using the one-hot encoding described below. It is advantageous if, whichever logic is used, the slice logic is configured to generate the modulo result at least partly using the results of one or more modulo operations x[j:k]mod($2^n$±1) calculated in accordance with equations 7 and 9. For example, in the one-hot encoding example described below, the results of one or more modulo operations calculated using bits of x in the range x[w−1:n] could be combined with the result of x[n−1:0]mod($2^n$±1) in the manner described for the one-hot example so as to yield the complete modulo=x[w−1:0]mod($2^n$±1).

Figure 12:
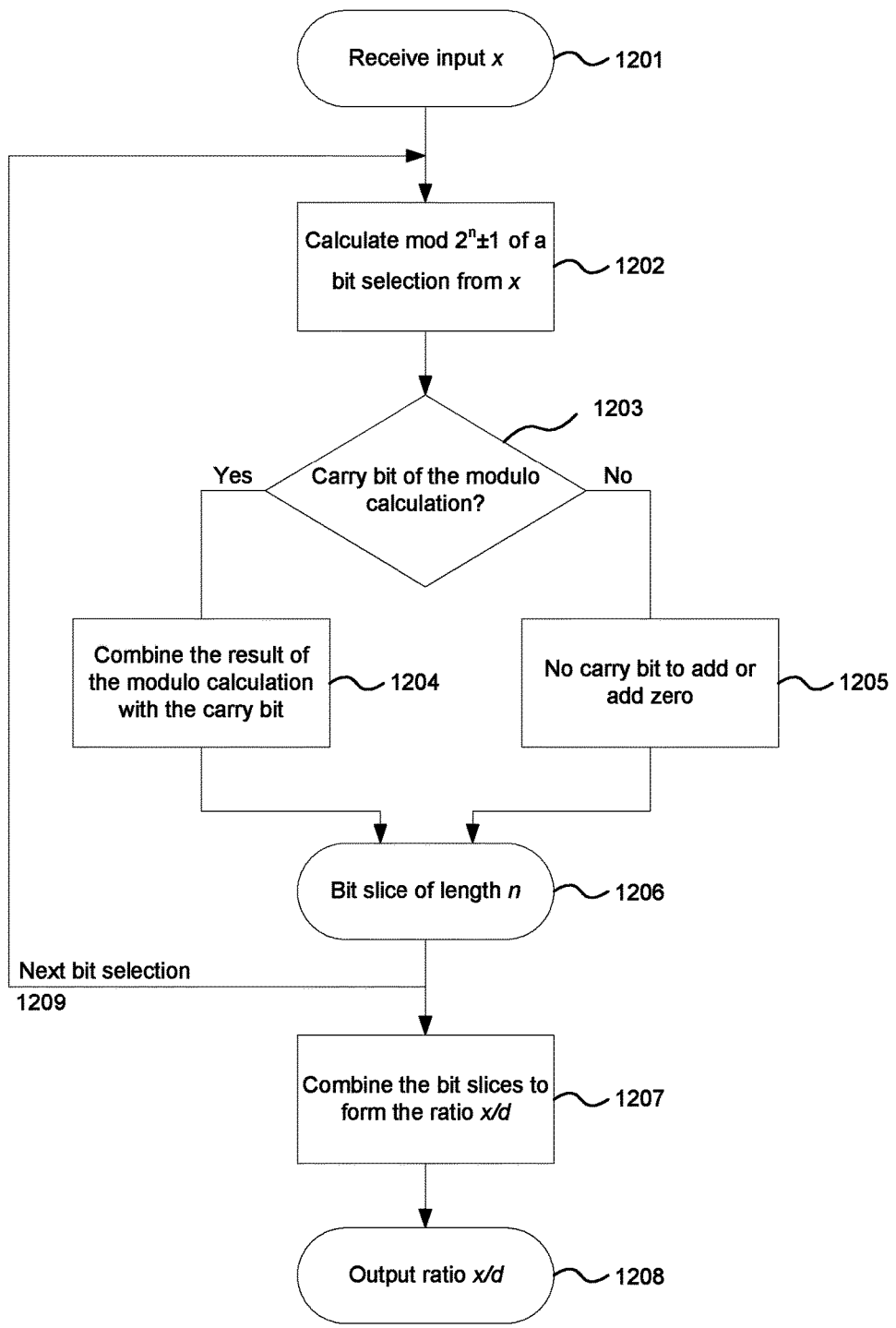
FIG. 12 is a flowchart illustrating the operation of a binary logic circuit configured according to the present invention.

An example of the operations performed by the binary logic circuit 500 is illustrated in the flowchart of FIG. 12. The binary logic circuit receives input x 1201 for which the ratio x/d is to be determined for a positive integer d of the form d=$2^n$±1. Slice logic of the binary logic circuit (e.g. a plurality of modulo logic units) is configured to perform modulo operations 1202 of the form x[j:k]mod($2^n$±1) on bit selections x[j:k], for example in accordance with equation 7 or 9. A carry check is performed 1203 at the slice logic in order to determine whether a carry bit is to be combined with the result of the modulo operation 1202. The carry check may itself comprise one or more modulo operations in accordance with equations 8 or 10, and/or the carry check may use the results of one or more modulo operations which have been performed. If a carry bit is to be added, a carry bit is combined (e.g. added) 1204 to the result of the modulo operation 1202. In the case that $d=2^n-1$ the carry bit is 1; in the case that $d=2^n+1$ the carry bit is $-1$. If no carry bit is to be added then no combination operations as such is performed 1205 or the result of the modulo operation is combined with zero. The result of the combination is bit slice 1206 of length n.

The generation of a bit slice 1206 is repeated 1209 for each bit selection so as to generate the set bit slices over i. This repetition need not be performed sequentially and the indicated repetition 1209 in FIG. 12 is merely schematic: part or all of the steps 1202 to 1204/1205 may be performed in parallel in order to form a plurality of bit slices. The bit slices are combined at 1207 in order to form the complete ratio x/d at 1208. This combination may simply comprise, for example, the storing of the bits of the slices at registers of the binary logic such that once all of the bit slices have been generated the complete ratio is available at the registers.

Note that the calculation performed at step 1202 need not be the same calculation in order to form each bit slice: the result of the modulo calculation for some bit selections from x may be determined based on the result of prior modulo calculations for other bit selections from x.

Exemplary implementations of the binary logic circuit 500 will now be described with respect to FIGS. 8 and 9.

One-Hot Modulo Encoding

It can be advantageous to use an encoding other than a simple binary encoding for the results of the modulo calculations performed by the slice logic 510. In this example, a one-hot encoding is used in which the result of each modulo calculation of the form $x[j:k] \bmod (2^n\pm1)$ performed by the slice logic is encoded as a value d bits wide with only one high bit (i.e. one-hot) and all other bits zero. Configuring the slice logic 510 to generate one-hot encodings enables the results of modulo calculations to be combined in a particularly efficient logic tree so as to form the bit slices of output div. A one-hot encoding is particularly advantageous when n is small and can be employed for any odd value of d. This is because a one-hot encoding is d bits in length rather than the binary length of $\lfloor \log_2(d-1) \rfloor+1$ and hence the amount of logic required typically grows as $d^2$. n may be considered small when, for example, the divisor $d=2^n\pm1$ is 3, 5, 7. In some implementations, n may also be considered small when d is 9, 11, 13, etc.

Figure 8:
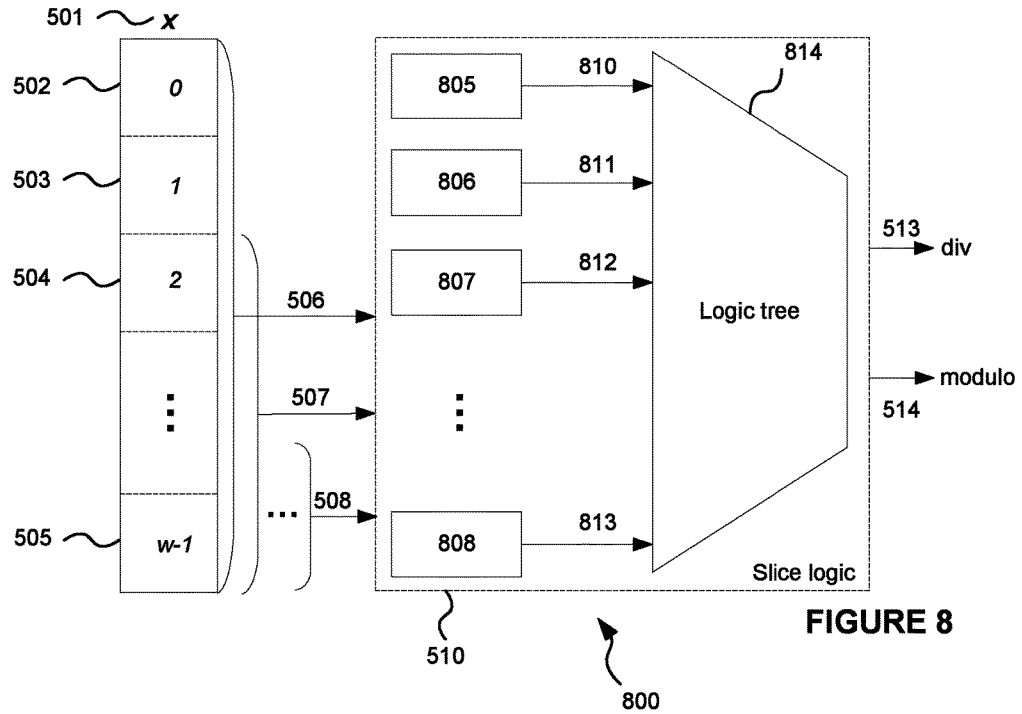
FIG. 8 is a schematic diagram of a first example of a binary logic circuit configured according to the present invention.

FIG. 8 shows a binary logic circuit 800 having slice logic 510 configured to operate using such one-hot encodings. In this example, the slice logic comprises a plurality of modulo logic units 805-808 each configured to perform a modulo calculation of the form $x[j:k] \bmod (2^n\pm1)$ and output the result as a one-hot encoding 810-813. Each of the modulo logic units may be configured to perform a different modulo calculation (e.g. for different j, k).

The number of bits required to represent a modulo calculation a mod b in binary form is $\lfloor \log_2(b-1) \rfloor+1$, where the output may take any value between 0 and b−1. For example, in the present case with a divisor $d=2^n-1$, a value of $n=2$ means that only $\lfloor \log_2(2^2-1-1) \rfloor+1=2$ bits are required to represent the output of the modulo operations in binary for the divisor d=3. A one-hot encoding encodes the outputs using d bits—in this case, 3 bits. This follows because there are only 3 possible outputs of a mod 3 and hence only three one-hot encodings are required to represent those outputs:

0 mod 3->"001"
1 mod 3->"010"
2 mod 3->"100"

All other values of a in the modulo calculation wrap around onto one of these three values. These values represent one choice of encoding—other encodings may be used where the possible one-hot representations are differently assigned to the possible outputs of the modulo operations. The modulo logic units may be configured to generate the relevant one-hot representations on performing a modulo operation. In other examples, the slice logic 510 may be provided with a look-up table (LUT) and configured to replace the binary outputs of the modulo logic units with the corresponding one-hot representations defined at the LUT.

Generally, given d-bit encodings of a and b and assuming d is odd, the $i^{th}$ bit of the one-hot encoding of $(a*2^k+b) \bmod d$ can be calculated as follows. There are $d^2$ number of choices of values for (a, b) and for exactly d of these choices $(a*2^k+b) \bmod d=i$. For example, the case (a, b)=(0, i). This is because there exists a value r such that $(r*2^k) \bmod d=1$.

The set of d values such that $(a*2^k+b) \bmod d=i$ is (a, b)=(r*(i−j)mod d, j) for j=0, ..., d−1. The $i^{th}$ bit of the one-hot encoding may then be given by:

for the given i combine the corresponding bits of a and b in an AND operation for each of the bit positions in a and b so as to generate d intermediate values;
combine the d intermediate values with OR operations so as to yield the $i^{th}$ bit of the one-hot representation.

For example, for d=3 and hence the case $(2*a+b) \bmod 3$, the $0^{th}$ bit of the one-hot encoding is given by:

(a(0)AND b(0))OR(a(1)AND b(1))OR(a(2)AND b(2))

And similarly for the 1st and 2nd bits of the 3-bit one-hot encoding.

Logic could be provided at the slice logic to generate these encodings for a given input, but preferably the one-hot encodings are written to a look up table so as to, on receiving the result of a modulo calculation, enable the logic to read out the one-hot encoding of that result.

An advantage of using a one-hot encoding is that the one-hot representations 810-813 of the outputs of the modulo logic units 805-808 may be efficiently combined at an logic tree 814. The logic tree 814 is an example of combination logic 512. This is because the use of a one-hot encoding allows the output of modulo operations on larger bit selections of x to be determined from combinations of the outputs of modulo operations on smaller bit selections of x. This follows from the fact that:

$$2^{n+i} \bmod (2^n\pm1)=(\mp1)^i \qquad (11)$$

For example, x[f:g] mod $(2^n\pm1)$ and x[g−1:h]mod $(2^n\pm1)$ may be combined together to form x[f:h]mod $(2^n\pm1)$ since according to equation 11:

$$(a*2^{n*i}+b) \bmod (2^n\pm1)=(\mp a+b) \bmod (2^n\pm1) \qquad (12)$$

So following on from the example above where n=2, d=3, combinations of the outputs of mod 3 operations can be represented by one-hot encodings as follows:

(0+0) mod 3=(2+1) mod 3=(1+2) mod 3=0 mod 3 ->"001"
(1+0) mod 3=(0+1) mod 3=(2+2) mod 3=1 mod 3 ->"010"
(2+0) mod 3=(1+1) mod 3=(0+2) mod 3=2 mod 3 ->"100"

Any suitable logic tree 814 may be used to combine the one-hot representations of the modulo outputs so as to form the output div. However, since only 1 bit is high for each representation of a modulo operation in the one-hot encoding scheme, it is advantageous to implement the logic tree using just AND and OR gates. This minimises complexity, latency, and the area consumed by the binary logic circuit.

Furthermore, the structure of logic tree 814 may be readily optimised to minimise delay on the critical path or to minimise chip area consumed by the circuit. Given r inputs to the tree, in a first example the logic tree may be structured to have a depth of order log(r) with r*log(r) combinations in the tree. This structure minimises critical delay. In a second example, the tree may be structured to have a depth of order r with r combinations in the tree. This structure minimises circuit area. Intermediate structures between these exemplary possibilities exist which may provide a desired balance of latency and circuit area.

The logic tree 814 may have a structure analogous to, for example, a carry look-ahead adder (which would be a tree of depth log(r)), or a ripple carry adder (which would be a tree of depth r).

It will typically be necessary to decode the one-hot encoded slices of div so as to form a binary representations. This may be achieved by use of a suitable lookup table—e.g. logic which for each possible input provides a predefined output.

In one example, the decode from a one-hot modulo encoding of x may be calculated as follows. In this example, the input x has been sliced up into k slices in the following way:

$$x[i_{k-1}-1:i_{k-2}], x[i_{k-2}-1:i_{k-3}], \ldots, x[i_1-1,i_0] \text{ where } i_{k-1}=w \text{ and } i_0=0$$

The output div may be calculated according to the same sliced structure. For example, $div[i_j-1:i_{j-1}]$ can be calculated from $x[w-1:i_j] \bmod d$ and $x[i_j-1:i_{j-1}]$. $x[w-1:i_j] \bmod d$ can be calculated by using the one-hot encoding and combining the more significant bit slices $x[i_{k-1}-1:i_{k-2}], \ldots, x[i_{j-1}-1:i_j]$ in the manner described above.

The output div is given by:

$$div[i_j - 1:i_{j-1}] = \left\lfloor \frac{(x[w-1:i_j]\bmod d)*2^{i_j-i_{j-1}} + x[i_j-1:i_{j-1}]}{d} \right\rfloor$$

which follows from a general application of equations 5 and 6 above because:

$$div[i_j - 1:i_{j-1}] =$$

$$(div[w-1:i_{j-1}])\bmod 2^{i_j-i_{j-1}} = \left\lfloor \frac{x[w-1:i_{j-1}]}{d} \right\rfloor \bmod 2^{i_j-i_{j-1}} =$$

$$\left\lfloor \frac{2^{i_j-i_{j-1}} * x[w-1:i_j] + x[i_j-1:i_{j-1}]}{d} \right\rfloor \bmod 2^{i_j-i_{j-1}} =$$

$$\left\lfloor \frac{2^{i_j-i_{j-1}} * \left( d* \left\lfloor \frac{x[w-1:i_j]}{d} \right\rfloor + (x[w-1:i_j]\bmod d) \right) + x[i_j-1:i_{j-1}]}{d} \right\rfloor \bmod 2^{i_j-i_{j-1}} =$$

$$\left\lfloor 2^{i_j-i_{j-1}} * \left\lfloor \frac{x[w-1:i_j]}{d} \right\rfloor + \frac{2^{i_j-i_{j-1}} * (x[w-1:i_j]\bmod d) + x[i_j-1:i_{j-1}]}{d} \right\rfloor$$

$$\bmod 2^{i_j-i_{j-1}} = \left( 2^{i_j-i_{j-1}} * \left\lfloor \frac{x[w-1:i_j]}{d} \right\rfloor + \right.$$

$$\left\lfloor \frac{2^{i_j-i_{j-1}} * (x[w-1:i_j]\bmod d) + x[i_j-1:i_{j-1}]}{d} \right\rfloor \right)$$

$$\bmod 2^{i_j-i_{j-1}} = \left\lfloor \frac{2^{i_j-i_{j-1}} * (x[w-1:i_j]\bmod d) + x[i_j-1:i_{j-1}]}{d} \right\rfloor$$

$$\bmod 2^{i_j-i_{j-1}} =$$

$$\left\lfloor \frac{2^{i_j-i_{j-1}} * (x[w-1:i_j]\bmod d) + x[i_j-1:i_{j-1}]}{d} \right\rfloor$$

Using the one-hot encoding of $x[w-1:i_j] \bmod d$ and the bit slice $x[i_j-1:i_{j-1}]$ as inputs either a look-up table or explicit logic function (feasible depending on the number of table inputs), which returns the values of 0 through to $2^{i_j-i_{j-1}}-1$ for $div[i_j-1:i_{j-1}]$.

This can be done similarly for all bit slices, except the most significant $div[i_{k-1}:i_{k-2}]$ which is solely a function of the bit slice $x[i_{k-1}:i_{k-2}]$ and the modulo value can be assumed to be zero in the decoding lookup table.

If the bit-slices are small enough, it's typically easy for someone skilled in the art to make some logic by hand to perform this decode form one-hot to binary efficiently and the decode (and also initial one-hot encode) logic will be cheap. However, the trade-off is the smaller the bit slices, the more of them that there are to encode/decode and combine using the combination logic (trees with more initial nodes are needed).

It is possible to split up the input x into portions which differ in length by an amount different to n because, given that i is known at design time along with the one-hot encodings of a and b, the amount of logic required to calculate the one-hot encoding of $(a*2^i+b)\bmod d$ is independent of the value of i and so does not need to be restricted to a multiple of n for $d=2^n\pm1$.

This enables the amount of combination logic to be reduced by increasing the width of the initially encoded binary portion of x, since this will mean there are fewer one-hot values to combine. However, this will be at the expense of a more complex one-hot encoding of the results of the modulo operations and consequently of the decoding of the slices of div (although the encode and decode steps can be performed using look-up tables).

Alternatively, the width of the binary portions of x may be decreased, but this means there are more one-hot encodings to combine and more modulo values to compute to calculate this increased number of bit slices of div—in other words, an increased amount of combination logic is required.

For example, in the case that d=3 the bit slices generated of the output div could be of width 1 bit rather than n=2 bits. This makes the initial one-hot encoding straightforward since only a NOT gate is required: i.e. 0 becomes 000, 1 becomes 001, and so generally x[i] becomes 0x[i]NOT(x[i]). The decode of the bit slices is similarly straightforward because equation 7 may be rewritten in this d=3 case as:

$$div[i]=?1:0=2*(x[w-1:i+1]\bmod 3)+x[i]\geq 3?1:0$$

Suppose the one-hot encoding for $x[w-1:i+1]\bmod 3=e(i+1)[2:0]$ then we have $div[i]=e(i+1)[2]$ OR $(e(i+1)[1]$ AND $x[i])$ which may be implemented using a simple ANDOR logic gate.

The cost of decreasing the width of the binary portions of x is that the combination logic tree is larger because it now has twice as many inputs. However, the encode/decode logic can be smaller. The optimum binary portion width in terms of the size and/or speed of the resulting circuit can be determined at design time through appropriate modelling.

Most generally the bit slices do not need to be all of the same length. This can be accommodated through appropriate modification of the combination logic at the logic tree 814.

In other examples, encoding schemes other than one-hot encoding may be used.

Signed Case

It will be appreciated that the one-hot binary logic circuit shown in FIG. 8 may be readily extended to support a signed input variable x. For example, in the case of a signed 8-bit number x, the one hot encoding is given by:

$$onehot(x[i]) = \begin{cases} 0 \cdot x[i] \cdot \text{not}(x[i]) \text{ for } i = 0, \ldots, 6 \\ x[i] \cdot 0 \cdot \text{not}(x[i]) \text{ for } i = 7 \end{cases}$$

Where onehot(x[i]) expresses the one-hot signals {"001", "010","100"} as the numbers {0,1,2} respectively such that x[i]=0,1 for i=0, . . . 6 and x[7]=0,1 (where the value x[7] represents is −1*x[7] since it's the signed bit) and the difference between i=0, . . . 6 and i=7 is 0, −1 mod 3=0,2. Performing division by 3 using slices of length 1 yields a signed 7-bit div output:

$$div[i]=onehot(x[7:i+1]\bmod 3)[2] \text{ OR}(onehot(x[7:i+1]\bmod 3)[1] \text{ AND } x[i]) \text{ for } i=0, \ldots, 6$$

Note that the sign bit of the output div[6] logic simplifies to:

$$div[6] = onehot(x[7]\bmod 3)[2] \text{ OR}$$
$$(onehot(x[7]\bmod 3)[1] \text{ AND } x[6] = x[7] \text{ OR } '0' = x[7]$$

This is the sign bit of the input for a round to negative infinity (RNI) rounding. A negative input always gives a negative output.

In general, it is possible to "sign-extend" the input by a bit, so the sign-bit is now 1-bit more significant (e.g. x[n] rather than at x[n−1]). This results in the sign-bit no longer being part of the slicing operations and it can be handled separately. However, the modulo value of the most significant bit slice must still take into account the influence of the sign-bit on the modulo value: in other words, x[n−1:$i_k$] mod d should still be encoded as though x[n−1] is the sign-bit.

The most significant bit-slice may therefore be evaluated according to a slightly altered equation:

$$div[n-1:i_k] = \left\lfloor \frac{(x[n]\bmod d) * 2^{n-i_k} + x[n-1:i_k]}{d} \right\rfloor$$

Where x[n] here is interpreted as having a value of either −1 or 0 (rather than 1 or 0).

In this equation there is now a potentially non-zero mod term which isn't present in the unsigned equation:

$$(x[n]\bmod d) = \begin{cases} 0 & \text{when } x[n] = '0' \\ d-1 & \text{when } x[n] = '1' \end{cases}$$

The output sign-bit should always match the input sign bit for RNI rounding. Unsigned division could also be treated in this manner, but the sign bit x[n] is always trivially zero, so the mod term in the above equation never occurs.

Full adder reduction

Figure 9:
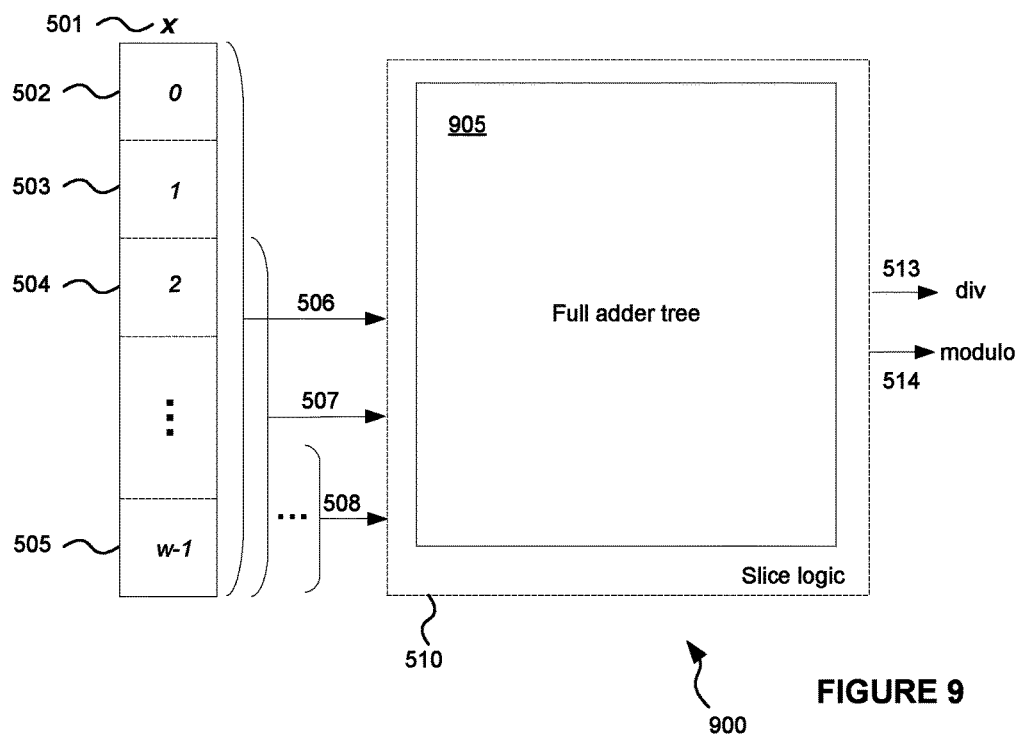
FIG. 9 is a schematic diagram of a second example of a binary logic circuit configured according to the present invention.

A second exemplary implementation of the binary logic circuit is shown in FIG. 9. Binary logic circuit 900 uses a logic tree of full adders 905 to perform the modulo operations of the form x[j,k]mod($2^n$±1). A full adder may be provided for each modulo operation, a full adder may be provided for each different modulo operation, or fewer full adders than the number of different modulo operations may be provided with full adders being configured to share logic elements and/or values generated at a full adder, as explained below. A full adder will now be described with respect to FIGS. 1-4, 6-7 and 10 for the case d=$2^n$−1. In the following paragraphs, the symbol m will be used in place of n to represent the exponent of 2 in the divisor d.

A full adder 100 for evaluating y=x mod($2^m$−1) for a given value of m and an input value x is shown in FIG. 1. The full adder comprises reduction logic 101 configured to reduce the range of selected input bits of x of length v (recalling that in each modulo operations only a selection of the w bits of x are used) to a sum x' of two m-bit numbers, and addition logic 104 configured to calculate a sum determined from the sum x' of two m-bit numbers in such a way as to generate y. In the case that v mod m=0, exception logic 102 and a XOR 106 may be provided to ensure that the full adder provides the correct output in the case that all of the digits of x are 1.

Reduction logic 101 operates on a binary input value x which in the present examples will be a bit selection x[j:k] from the input variable x shown in FIG. 5. Most generally, the reduction logic could comprise any kind of reduction cell(s) arranged in a manner suitable for reducing the range of x to a sum of two m-bit numbers and configured such that after each reduction step bits carried above the m-th bit position are wrapped around into a position in the first bit position. This is acceptable because $2^m\bmod(2^m-1)=2^0$. In the full adder examples described herein, one or more reduction cells are arranged to compress x expressed or interpreted as x', which is a sum of consecutive m-bit portions of x as indicated by 402 in FIG. 4. This particular expression or interpretation of x as a sum 402 of rows of length m can be used in place of x to calculate y=x mod($2^m$−1) because x mod($2^m$−1)=x'mod($2^m$−1). This can be appreciated as follows:

$$x\bmod(2^m - 1) = \left(\sum_{i=0}^{n-1} 2^i * x[i]\right)\bmod(2^m - 1) \quad (13)$$

$$= \left(\sum_{i=0}^{n-1} (2^i)\bmod(2^m - 1) * x[i]\right)\bmod(2^m - 1)$$

$$= \left(\sum_{i=0}^{n-1} 2^{i\bmod m} * x[i]\right)\bmod(2^m - 1)$$

While the range of x is [0,$2^v$−1], the range of x' is [0,k*($2^m$−1)] where k is the number of rows of x' and at 402 is less than or equal to $$\left\lceil \frac{n}{m} \right\rceil.$$

Consider a simple example of a 12 bit number x=110101101111. This number may be expressed in the form x' as a sum of consecutive m-bit portions of x as follows:

```
  1111
 +0110
 +1101
```

The one or more reduction cells of reduction logic 101 may be one or more full adders arranged to reduce the rows of x' down to a sum of two rows of length m. A full adder receives two one-bit values and a carry bit as its inputs and outputs the sum of those bit values along with a carry bit. A full adder can therefore be used to sum the bits of a pair of rows of x' so as to compress those two rows of m bits into a single row of m bits and a carry bit. As is known in the art, this can be achieved by using a cascade of m full adders or by using fewer than m full adders and iteratively operating one or more of those full adders on the output of previous full adders.

Other types of reduction cells could alternatively be used, such as half adders. It will be appreciated that there are a large number of possible adder designs which can be used to reduce a sum of a plurality of m-bit binary numbers to a sum of two m-bit binary numbers. Any suitable adder design could be used in the reduction logic to reduce the range of x in accordance with the principles described herein.

The reduction logic 101 may comprise one or more reduction cells. In general, any kind of reduction cell able to reduce a binary sum of s rows down to a binary sum of t rows (a s to t reduction cell) may be used. The one or more reduction cells are configured so as to provide a pair of rows x' as the output of the reduction logic. Multiple reduction cells may be arranged in series or in parallel. In accordance with the teaching below, the reduction logic is configured to, following each reduction step, wrap-around carry bits at bit position m+1 to the first bit position.

The reduction logic 101 of the full adder operates until the rows of x' have been reduced to two rows, at which point x' lies in the range $[0, 2*(2^m-1)]$. These two rows of length m of x' are referred to as β and γ.

An advantageous form of reduction cell 302 will now be described which provides high speed compression of x'. Each reduction cell comprises m full adders configured to operate on three rows of x' each of length m. Each full adder operates on a column of the corresponding bits of each row so as to compress the three rows into two rows of length m. The operation of the reduction cell is illustrated schematically in FIG. 10 which shows three rows 1001-1003 of length m (in this example m=5) that represent the input to the reduction cell. The reduction cell comprises five full adders 1004, each of which is configured to operate on a column of corresponding bits from the three rows. For example, full adder 1008 operates on the first bits of the rows which in this case involves summing the bits 1, 0 and 1. The output of the full adders comprises a carry bit and a sum bit, with the output of each full adder being indicated by the dashed arrows in the figure. For example, the output of full adder 1008 is represented by bit pair 1005 and comprises a carry bit 1 and a sum bit 0. Collectively, the carry bits represent a first output row 1006, and the sum bits represent a second output row 1007.

Prior to making use of the pair of output rows of a reduction cell, its carry bit 1009 which exists (logically at least) in the m+1 column/bit position is wrapped around to the first column/bit position. This is acceptable because $2^m \bmod(2^m-1)=2^0$ and ensures that the rows of x' remain aligned and of length m bits. The wrap-around of carry bits is described in more detail below with respect to FIG. 4. At a physical level, this wrap-around of the carry bit can be achieved through appropriate wiring of the output of the reduction logic.

Figure 10:
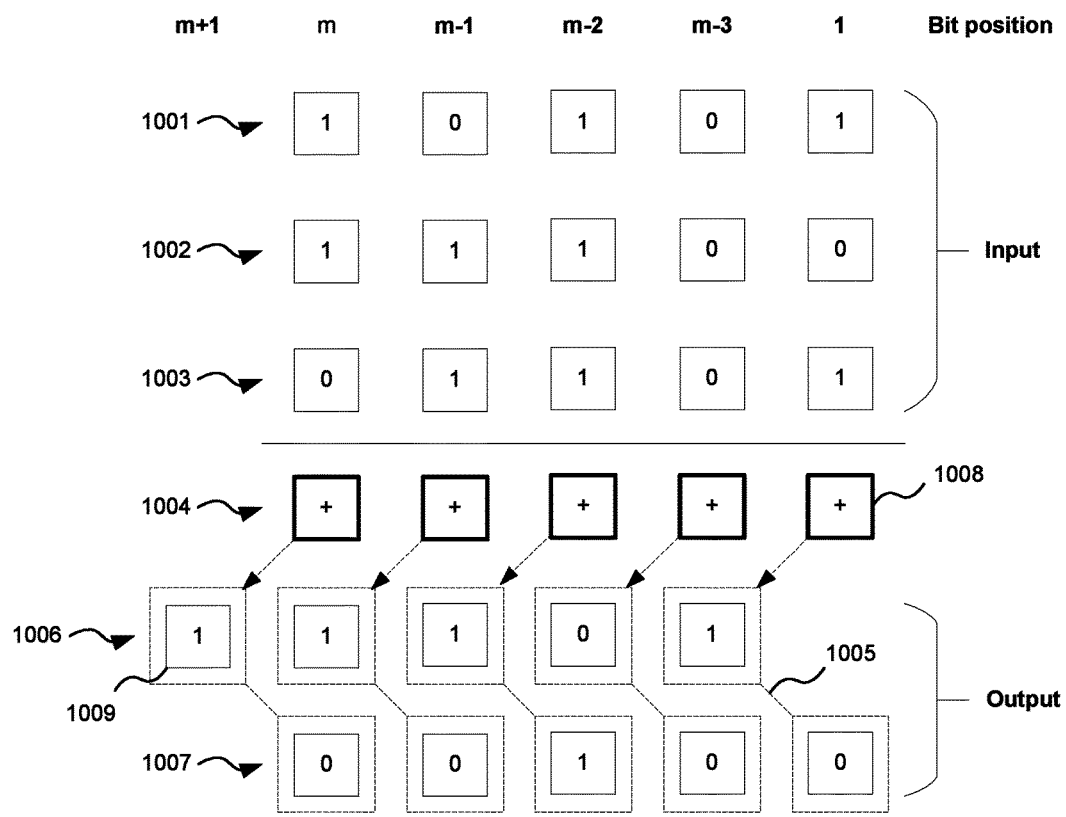
FIG. 10 schematically illustrates the operation of 5 full adders in parallel.

By operating a reduction cell comprising m full adders on the columns of a set of three rows of x' in the manner shown in FIG. 10, the number of rows of x' can be reduced by 1. It is however preferable for reduction logic 101 to comprise a plurality of reduction cells 302 operating in parallel on the rows of x'. Each operation of such a set of reduction cells would represent a reduction step which reduces the number of rows of x' by the number of reduction cells. Since the length in bits of x which the full adder is arranged to process is known at design time, it is advantageous for the reduction logic 101 to comprise as many reduction cells as there are sets of three rows of x' each of length m. In other words: a binary input x of length v would create $$\left\lfloor \frac{v}{m} \right\rfloor$$

rows of length m, plus potentially a row of length less than m. Empty bits in any rows of less than m can be set to 0.

For a binary input of length v, $$\left\lfloor \left\lceil \frac{v}{m} \right\rceil / 3 \right\rfloor$$

reduction cells may be provided so as to reduce the number of rows of x' by around a third.

$$\left\lceil \frac{v}{m} \right\rceil$$

represents the initial number of rows of x', which may include a row of length less than m. When v is an integer multiple of m, the number of reduction cells is $$\left\lfloor \frac{v}{3m} \right\rfloor.$$

As the number of rows of x' becomes smaller, the number of reduction cells also becomes smaller.

In order to reduce the number of rows of x' down to two, a set of reduction cells at the reduction logic may be configured to operate iteratively on x' until the number of rows of x' reaches two. For example, reduction logic comprising $$\left\lfloor \left\lceil \frac{v}{m} \right\rceil / 3 \right\rfloor$$

reduction cells may be configured to iteratively perform a series of reduction steps on the rows of x', with fewer and fewer reduction cells being required at each reduction step, until only two rows remain. This can be achieved through the use of sequential logic and a clock signal to schedule the outputs of the reduction cells for the previous reduction step into the inputs of the reduction cells for the next reduction step. However, such a configuration would typically allow only one reduction step (iteration) per clock cycle.

It is preferable that the reduction logic comprises multiple stages of reduction cells arranged in series with each stage of reduction cells receiving its input from the output of the previous stage. The reduction cells of each stage may be configured to operate in parallel. As many stages of reduction cells are provided as are required to reduce an input x down to a sum of binary values of length m in a single operation without iteration. This arrangement is shown for reduction logic 101 in FIG. 3. In this example, the reduction logic comprises a plurality of reduction stages of which three are shown: stages 301, 302 and 303. Each reduction stage comprises one or more reduction cells 304.

Each reduction cell 304 comprises a set of full adders as shown in FIG. 10 which are each configured to sum a set of three rows of x' so as to, at each reduction stage, form in their place a new pair of rows of x' and hence reduce the number of rows of x' by one. By operating reduction cells 304 in parallel it is possible to reduce the number of rows of x' by around a third at each reduction stage.

The first reduction stage 301 comprises $$\lfloor \lceil \tfrac{v}{m} \rceil / 3 \rfloor$$

reduction cells 304 each having m full adders arranged to operate in parallel on a set of three rows in the manner shown in FIG. 10. Each reduction cell reduces the 3 rows it operates on down to 2 rows. The number of rows provided at the output of the first reduction stage will therefore be:

$$\lceil \tfrac{v}{m} \rceil - \left\lfloor \frac{\lceil \tfrac{v}{m} \rceil}{3} \right\rfloor = \left\lceil \frac{2 * \lceil \tfrac{v}{m} \rceil}{3} \right\rceil \quad (14)$$

A second reduction stage (e.g. 302) is arranged to operate on the output of the first reduction stage and comprises a number of reduction cells appropriate to the number of rows provided at the output of the first reduction stage. For example, if the number of output rows from the first stage is b then the second reduction stage comprises $\lfloor b/3 \rfloor$ reduction cells 304. A sufficient number of further reduction stages are arranged in series in this manner until the output of a final reduction stage 303 includes only two rows. The final reduction stage 303 comprises a single reduction cell 304 which is configured to operate on the three output rows of the preceding reduction stage.

In this exemplary configuration, the total number of full adders present in the reduction logic will be $$m \left( \lceil \tfrac{v}{m} \rceil - 2 \right)$$

full adders. It will be appreciated that where a row has fewer than m bits, some of the inputs to the full adders will be zero. Such full adders could be considered to be half adders in which case there will be $$m \left( \lceil \tfrac{v}{m} \rceil - 2 \right) - (-v) \bmod m$$

full adders and $(-v) \bmod m$ half adders. The configuration described represents reduction logic having the minimum number of reduction stages.

Reduction logic configured in this manner with a series of reduction stages each comprising one or more reduction cells operating in parallel on the rows of x' would typically be able to perform the compression of x down to two rows of x' of length m in a single clock cycle of the digital platform on which the reduction logic is running. The use of serial reduction stages therefore offers a high speed configuration for reducing an input x to a sum of two rows β+γ which satisfy:

$$x \bmod (2^m-1) = (\beta+\gamma) \bmod (2^m-1) \quad (15)$$

As an example, consider an input x of length v=48 for the case m=5. For the preferred case, the first stage of the reduction logic comprises $$\left\lfloor \lceil \tfrac{48}{5} \rceil / 3 \right\rfloor = \left\lfloor \tfrac{10}{3} \right\rfloor = 3$$

reduction cells for operation on the initial set of 10 rows of x', leaving a short row of 3 bits unallocated to a reduction cell. Each reduction cell operates in the manner illustrated in FIG. 10 with each reduction cell of the first reduction stage reducing its three input rows down to two. The output of the first reduction stage, e.g. 301, would therefore comprise 7 rows. This may include the unallocated short row which could be considered as forming part of the 'output' of the first stage. Generally, one approach is to simply allocate groups of 3 rows to each reduction cell starting from the most significant row, even if that row includes leading zeros (i.e. where the row is 'short'). The second reduction stage, e.g. an intermediate stage 302, comprises two reduction cells which may be arranged to compress 6 of the 7 rows down to 4 rows, leaving 5 rows in total. Subsequent reduction stages (3 more would be required) may each comprise one reduction cell operating on three rows output by the previous stage until only two rows remain. This example represents one possible arrangement of reduction cells into a series of reduction stages at reduction logic 101.

It will be appreciated that full adders may be arranged in reduction cells in various other configurations. Because the number of rows available as inputs to a stage will be an integer multiple of 3, it is not always possible for a reduction stage to operate on all of the available rows. There are typically multiple ways of arranging the full adders within the reduction logic, whilst still achieving the same number of reduction stages. This freedom allows designers to, for example, optimise the reduction logic so as to minimise its area/delay/power when processed into a physical logic circuit.

Many other configurations of reduction logic are possible for compressing an input x down to two rows of length m. The reduction logic could comprise reduction cells other than full adders, such as ripple-carry adders which can be used reduce two rows down to one row. However, it is preferable not to use ripple carry adders configured to add pairs of rows in parallel implementations because the carry propagation of ripple carry adders results in relatively slow performance compared to other types of reduction cell.

Figure 4:
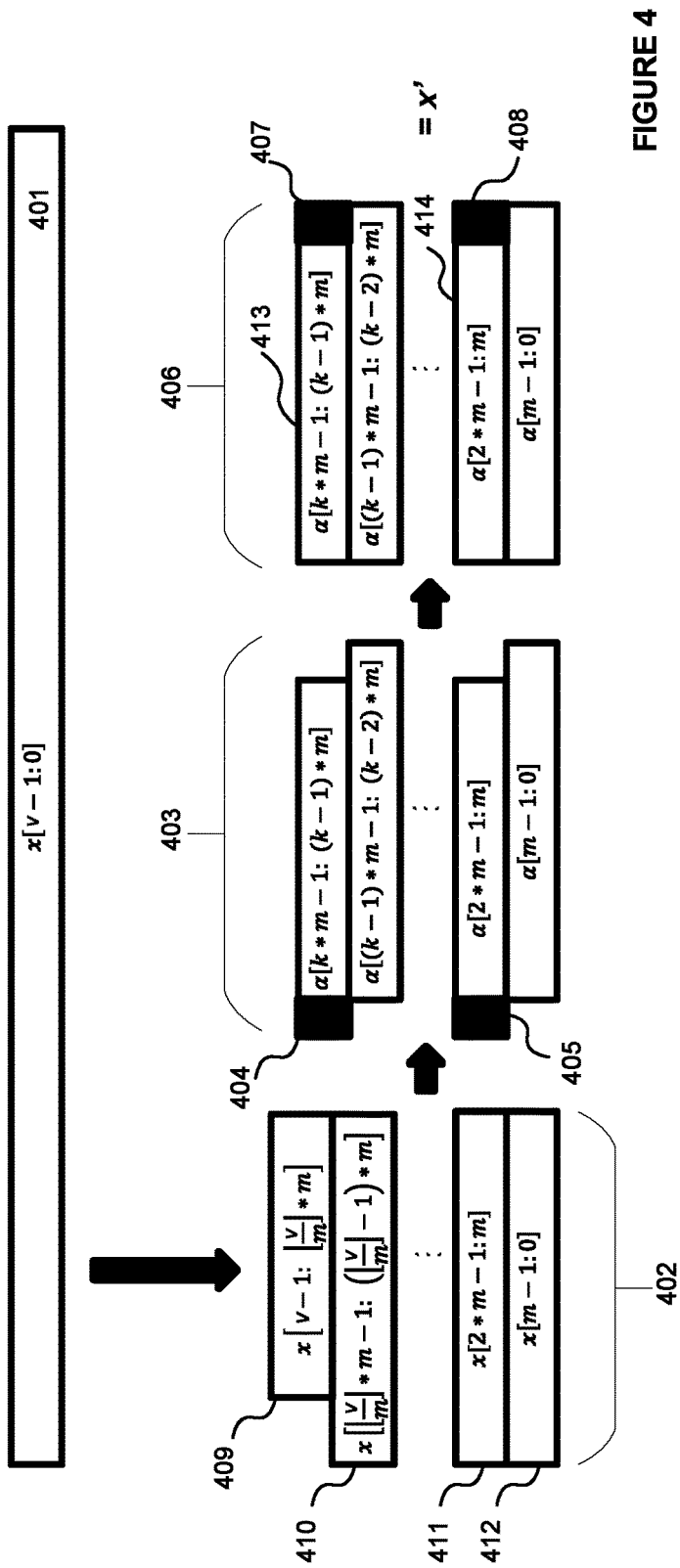
FIG. 4 illustrates the reduction of an input value x at the reduction logic.

FIG. 4 illustrates in more detail a first reduction step performed by reduction logic 101. The v bit positions of input x 401 are labelled in FIG. 4 as v-1 for the most significant bit down to 0 for the least significant bit. As has been shown, for the purposes of calculating $y = x \bmod (2^m-1)$, input x can be expressed as a sum 402 of rows of length m, where the rows represent consecutive m-bit portions of x. The number of rows will therefore depend on the length of x. Where v (the length of x) is not an integer multiple of m, there will be an insufficient number of bits to fill the final m-bit portion, indicated by 409 in FIG. 4. These bits may be set to 0 or interpreted as being 0 in the reduction logic.

The output of the first reduction step performed by the reduction logic on x' is illustrated at 406 in FIG. 4. The rows of sum 406 represent a new value a which has a $\mod(2^m-1)$ value equal to that of x. The formation of the output rows 406 will now be explained with reference to rows 403 (which are shown for clarity but preferably do not represent an intermediate result formed at the reduction logic).

The reduction performed by the first reduction step generates carry bits 404 and 405. As described above, any carry bits generated at the $m^{th}$ bit position by a reduction step (e.g. 404, 405) are wrapped-around to the first, least significant bit position (e.g. 407, 408) as shown at 406 in FIG. 4. This is acceptable because $2^m \mod (2^m-1)=2^0$. The wrapping-around of carry bits may be performed in any suitable manner—for example through suitable connections between reduction stages or through appropriate configuration of reduction logic configured to operate iteratively on x'. Because of the nature of the operations performed, the first bit position will always be empty for a row for which a carry bit is generated (e.g. row 1006 in FIG. 10).

In the example described above, each reduction step reduces the number of rows of x' by around a third. In other examples in which other types or arrangements of reduction cell are used, the number of rows may be differently reduced at each reduction step—for example, arrangements of reduction cells may be used which reduce 4 rows to 3, or 7 rows to 3. Such arrangements may generate more than one carry bit which is to be wrapped-around to empty least significant bit positions in accordance with the principles described above.

In the case that v mod m≠0, then in the initial expression of x' 402 there will always exist a row with a 0 bit for every possible input value of x. If a 0 is one of the three inputs to a full adder, then one of the two outputs must also be a 0, since only if each input is 1 is each output 1. Hence at least one bit of one of the rows of x' will be 0 after every reduction step performed by reduction logic 101. Since x' lies in the range $[0, 2*(2^m-1)]$, it follows that only in the case when v mod m=0 and $x=2^v-1$ (i.e. all n input bits are 1) does x' attain its maximum value of $2*(2^m-1)$ in which all the bits in the rows of x' remain 1. This point is relevant to the discussion below in which optional exception logic 112 (used in the case that v mod m=0) is provided in order to reduce the critical path delay at addition logic 104.

It is to be noted that FIG. 4 is a schematic illustration of the logical operation of the reduction logic in the present example and is not intended to suggest that the bit values of x need to be physically stored in the reduction logic as a sum of rows 402. The reduction logic may operate on the bit values of x held in any form at the reduction logic or at any other part of the full adder.

The usefulness of expressing an v-bit input x as a sum x' of two m-bit numbers β and γ for the purpose of calculating $y=x \mod(2^m-1)$ will now be demonstrated.

Figure 3:
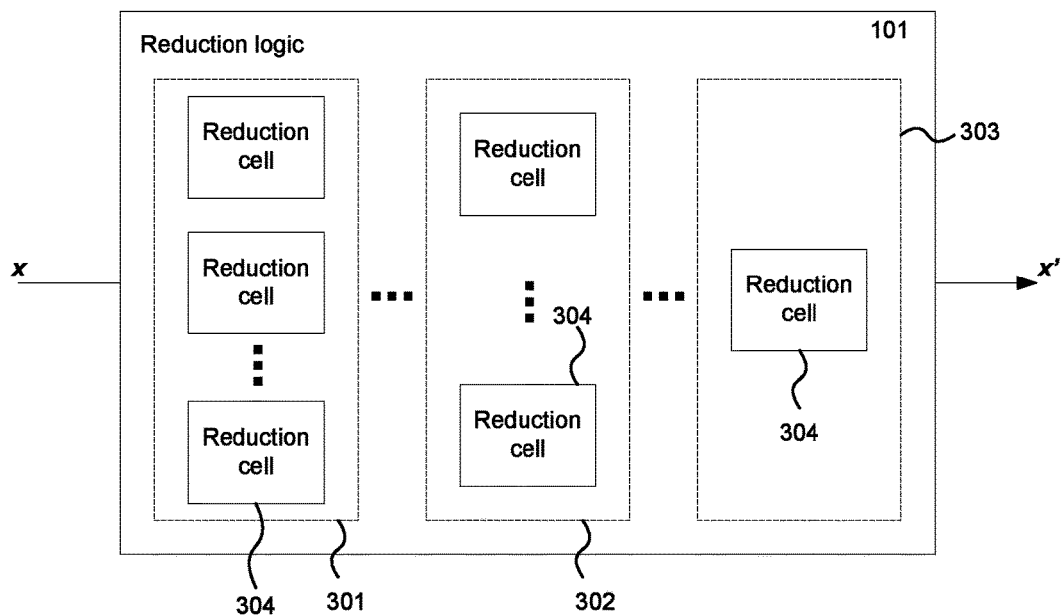
FIG. 3 is a schematic diagram of reduction logic for use at a full adder.
Figure 6:
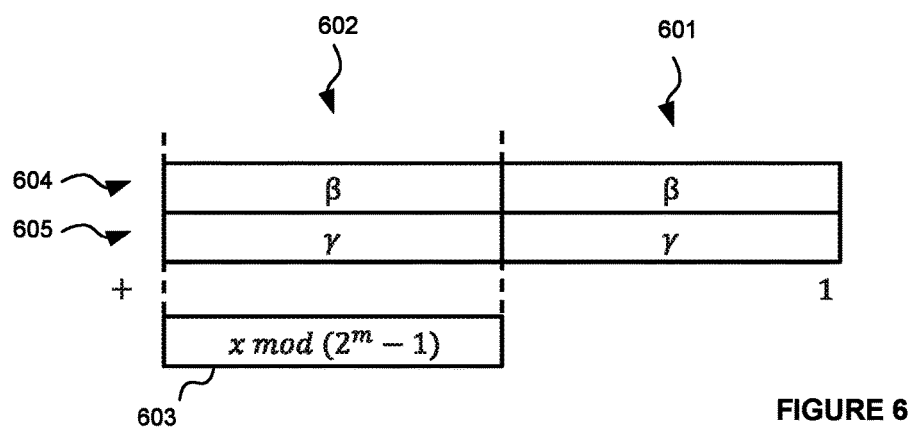
FIG. 6 is a schematic representation of addition logic performed at a full adder.

A representation of a binary sum for calculating $y=x \mod(2^m-1)$ is shown in FIG. 6. The sum in FIG. 6 may be performed at a binary multiplier array, such as a constant factor multiplication array (since v and m will be known at design time). The summation calculation shown represents a sum of:

a first row 604 comprising the bits of β repeated twice (i.e. the bits of β in column 601 and the bits of β left-shifted by m bits in column 602);

a second row 605 comprising the bits of γ repeated twice (i.e. the bits of γ in column 601 and the bits of γ left-shifted by m bits in column 602); and

1.

The significance of this calculation will now be explained. Note that columns 601 and 602 are merely schematic and need not represent independent sums.

In the case that v mod m=0 and $x=2^v-1$ (all of the digits of x are 1), the value $x'=β+γ=2^{m+1}-2$. This case may be handled separately at exception logic in the manner described below. For all inputs of x when v mod m≠0, and for all inputs of x when v mod m=0 except the above noted case when $x=2^v-1$, the value $x'=β+γ$ lies in the range $[0, 2^{m+1}-3]$. Consider a first part of that range in which $(β+γ) \in [0, 2^m-2]$. It follows from this possible range of values of β+γ that:

$$β+γ=((β+γ) \mod(2^m-1))=(x \mod(2^m-1)) \quad (16)$$

In other words, y is in this case equivalent to the sum β+γ. This is because the sum β+γ+1 in column 601 does not generate a carry bit since $0 \le β+γ+1 < 2^m$. The output 603 of the binary sum shown in FIG. 6 is in this case the same as the sum shown in column 602.

Now consider a second part of the range of x' in which $(β+γ) \in [2^m-1, 2^{m+1}-3]$. In this case the sum β+γ+1 in column 601 does generate a carry bit in the (m+1)th column because $2^m \le β+γ+1 < 2*2^m$. It follows that:

$$2^m-1 \le β+γ < 2*(2^m-1) \quad (17)$$

and so:

$$((β+γ+1) \mod 2^m)=(β+γ+1)-2^m=(β+γ)-(2^m-1)=((β+γ) \mod(2^m-1)) \quad (18)$$

For the complete range $(β+γ) \in [0, 2^{m+1}-3]$ we have that:

$$(β+γ) \mod(2^m-1)=(β+γ+1) \mod 2^m \text{ if } β+γ+1 \ge 2^m \quad (19)$$

and otherwise:

$$(β+γ) \mod(2^m-1)=(β+γ) \mod 2^m \quad (20)$$

It will be appreciated from the above that the sum shown in FIG. 6 can provide the required output $y=x \mod(2^m-1)$ through appropriate selection of the bits of the result 603 of the sum. For example, if β+γ+1 doesn't produce a carry bit, then the output 603 is given by the first m bits of the sum β+γ in column 602. This value is equal to $(β+γ) \mod 2^m$. If β+γ+1 does produce a carry bit, then the output 603 is given by the first m bits of the sum β+γ+1 in column 602, where the additional 1 is caused by the carry up from the sum formed in column 601. This value is equal to $((β+γ+1) \mod 2^m)$.

In other words, the output $y=x \mod(2^m-1)$ is given by the bit selection 603 equivalent to taking m bits of the result of the sum shown in FIG. 6 following a right-shift by m, i.e. the m bits at positions m+1 through 2m of the sum.

The sum and bit selection shown in FIG. 6 may be implemented in any suitable manner at a full adder, e.g. at addition logic 104 shown in FIG. 1. The output of the full adder would be the target value y. In some implementations, the full adder may not be configured to calculate the full sum shown in FIG. 6; a full adder could be configured to generate only the required bits 603 representing the output y in any suitable manner.

In the exemplary full adder shown in FIG. 1, the addition logic comprises an adder 105 which is an array configured to perform the sum of FIG. 6. The adder receives x' from the reduction logic 101 expressed as a sum of two m-bit values β and γ. The output 108 of the addition logic is the selection of the m bits at positions m+1 through 2m of the sum evaluated by the adder. This bit selection may be achieved in a physical logic circuit by hardwiring output bits from the sum formed by the adder to the output of the addition logic so as to generate the output y.

The adder 105 in FIG. 1 is of width 2*m. Because of the nature of the sum performed by the adder (see FIG. 6), there is a significant amount of repetition in the additions performed. It can be advantageous to, in place of adder 105, use a compound adder configured to calculate both β+γ and β+γ+1 at the same time. This example is illustrated by binary circuit 200 in FIG. 2 in which compound adder 205 receives both β and γ from reduction logic 101 and calculates both β+γ (signal 208) and β+γ+1 (signal 209). Referring back to FIG. 6, the compound adder 205 may be considered to concurrently calculate the sum of column 601 (β+γ+1) and the sum of column 602 (β+γ). A multiplexer 206 is used to select between the signals 208 and 209 based on a carry bit 207 generated by the sum β+γ+1. If the carry bit is 1, the output 108 of the addition logic is (β+γ+1)mod $2^m$; if the carry bit is 0, the output 108 of the addition logic is β+γ. The use of a compound adder can help to minimise circuit area of the adder.

In the case when v mod m=0 and x=$2^v$−1, β+γ=$2^{m+1}$−2, which lies outside the range [0,$2^{m+1}$−3]. In this case a multiplier array configured to calculate the sum shown in FIG. 6 does not provide the correct output. The output of logic implementing the sum shown in FIG. 6 when β, γ=$2^m$−1 is $2^m$−1, whilst the answer is in fact 0. It is advantageous to handle this exception outside of the addition array so as to not compromise the choice of array. For example, an array optimised for size/speed/power consumption can be selected as appropriate to the particular implementation, without the array needing to be modified to handle the exception case.

For example, returning to the exemplary full adders shown in FIGS. 1 and 2, when v modm=0 the exception in which all of the input bits of x are 1 may be handled at exception logic 102. The values of v and m will be known at design time. The exception logic is not required if v modm≠0. The exception logic may be configured in any suitable manner but it is advantageous if the output of the exception logic 107 is a binary indication (e.g. an exception flag) of 1 if all of the input bits of x are 1, and 0 if not all of the input bits of x are 1. This allows fast and efficient XOR logic 106 to be used to generate output y. The XOR logic could be included in addition logic 104/204. XOR logic 106 receives as its inputs the exception flag 107 from the exception logic 102 and the output 108 of addition logic 104/204. The output of the XOR logic is y for the exception case because $2^m$−1 (the output of the addition logic in this case) is the logical inverse of 0 (treating 0 as an m-bit binary string), so a XOR has the required effect.

Figure 7:
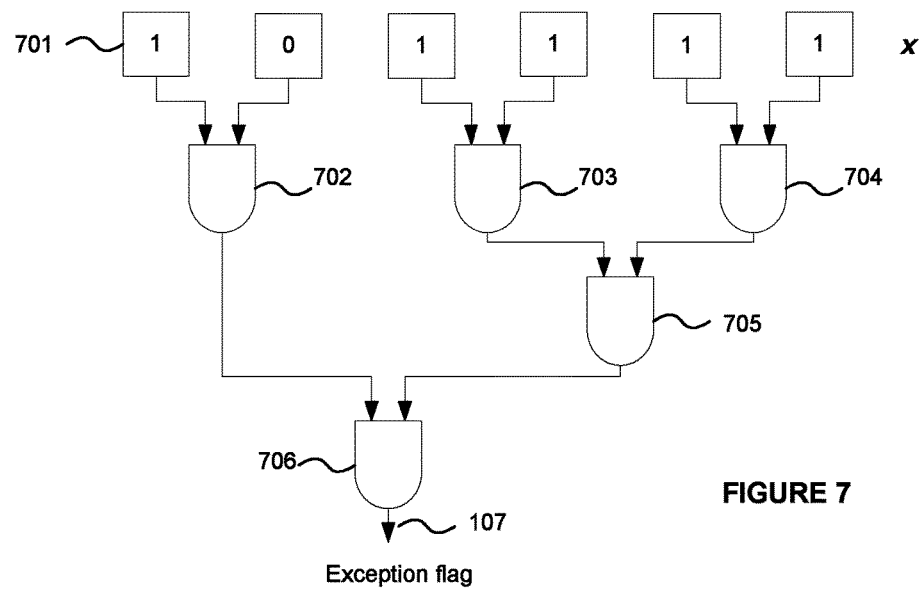
FIG. 7 shows an example of an AND tree for use at exception logic of a binary logic circuits for a full adder.

An example configuration of the exception logic 102 for use in the case when v modm=0 is shown in FIG. 7. The bits of an exemplary input x are schematically represented by bit values 701 in the figure. A tree of AND gates 702 is configured to receive the bits of x and provide a single output bit for use as exception flag 107. The tree of AND gates could be arranged in many different ways to achieve the same result. One arrangement suitable for operating on a 6-bit input x is shown in FIG. 7. The AND tree comprises of three AND gates 702-704 which each receive two bit values 701 as inputs, an AND gate 705 which receives as its inputs the outputs of AND gates 703 and 704, and an AND gate 706 which receives as its inputs the outputs of AND gates 702 and 705. The AND tree is arranged such that every bit value 701 provides an input to an AND gate. It will be appreciated that the output 107 of the AND tree will only be 1 in the event that all of the bit values 701 are 1. The AND tree in FIG. 7 may operate on inputs which are less than 6 bits in length by setting to 1 any bit values 701 which are unused by the input number.

It will be appreciated that in order to represent an input binary integer x as a sum of rows of m-bit binary integers x' it is not necessary to physically re-order the bits of the input binary integer. Full adders configured to operate on the rows of x' may logically interpret the bits of x as being represented as a sum of rows of m-bit binary integers x' and process them as such without any physical reconfiguration of x (e.g. actually splitting up x into m-bit rows in hardware is not required). This is generally true for the input and output values of the elements of full adders described herein: any binary values may be physically manifest in any form; the teaching herein shall be understood to explain the logical operation of full adders and is not intended to limit the possible physical representations of binary values in which binary values are stored, cached or otherwise represented (e.g at registers or memory of a binary circuit).

A full adder provides a low latency and area-efficient solution for calculating y=x mod($2^m$−1) in binary logic. It is therefore advantageous to make use of full adders 905 to perform modulo operations of the form x[j,k]mod($2^n$±1) in the binary logic circuit 900 in FIG. 9.

In order to form the output div 513, there are $$\lceil \frac{w}{n} \rceil - 1$$

different modulo values to calculate.

In some implementations, a plurality of full adders 905 may be provided at the slice logic 510 such that a full adder exists for each different modulo operation that is to be performed. This enables the modulo operations to be performed at least partly in parallel at the slice logic. Since there will typically be some repetition of modulo operations, it is advantageous however to at design time configure the binary logic circuit so as to include a shared full adder for each different modulo operation and to make use of the outputs from those full adders at the points required in the full adder tree 905. This approach still allows modulo operations to be performed in parallel but avoids duplication of logic and hence saves on chip area. The tree of full adders is configured such that the outputs of the modulo operations performed by the full adders are combined in accordance with equations 7 and 8 or 9 and 10 to form the bit slices of the output 513.

In other implementations not shown in the figures, a single full adder may be provided at the slice logic 510 to sequentially perform the required modulo operations and generate the bit slices of the output div 513 slice-by-slice. In such implementations, the slice logic may comprise state logic to process the results of the modulo operations into bit slices of output 513 and to cause the full adder to sequentially receive the correct bit selections of input x.

The structure of the tree of full adders 905 may be optimised to minimise delay on the critical path and/or to minimise chip area consumed by the circuit. This may be achieved, for example, through appropriate selection of the number and interconnection of full adders so as to control factors such as the degree of parallelisation and sharing of the full adders at the tree 905. As for the one-hot encoding example, the full adder tree could be configured to have a depth which is logarithmic or linear with respect to its number of inputs, or somewhere between the two.

The use of full adders has a further advantage in that many of the full adder stages (see 301-303 in FIG. 3) may be shared between different modulo calculations. This enables substantial improvements in chip area consumption to be achieved over conventional tree structures. For example, for a full adder tree of depth of order log r, instead of a quadratic number of full adder stages there need only be of order r log r full adder stages (each reducing 3 rows of m bits to 2 rows of m bits). Such a tree structure is useful for minimising critical delay. And, for a full adder tree of depth of order r, there need only be of order r full adder stages. This tree structure is useful for minimising chip area consumption.

Each full adder row may be identical to each other full adder row in the logic tree. Each full adder in a full adder row may be identical to each other full adder in that row, apart from the full adder operating on the most significant bit whose carry bit wraps around to the least significant output.

Full adder logic trees which are linear in depth tend to be smaller but can suffer from higher latency than logarithmic circuit designs. Logic trees may have a hybrid structure that is intermediate in depth between linear and logarithmic depth trees.

The reduction cells of a full adder may be arranged in a tree having a depth of linear order as follows. A reduction cell is provided to reduce the most significant 3 n-bit rows of the relevant bit portion of x to 2 n-bit rows (with the carry bit wrapping around in the manner described above). The next most significant n-bits of the bit portion of x row may then be combined with these 2 n-bit rows to produce 2 new n-bit rows. These 2 rows are then combined with the next most significant n-bits of the bit portion of x, and so on until the least significant row has entered a full adder producing the final 2 n-bit rows. The sum of each of the n-bit rows is equal to the result of the modulo operation of the form $x[j,k] \bmod(2^n-1)$ which the full adder is configured to perform.

It follows that, for r rows, $(r-2)*n$ full adders are required to produce all of the required modulo values in order to calculate all the slices of div. The $(r-2)*n$ full adders remove $(r-2)*n$ bits, reducing the initial r*n bits of the input (r n-bit rows) down to 2 n-bit rows. This arrangement of full adders is analogous to the carry tree used in a 'ripple carry adder'.

Figure 13:
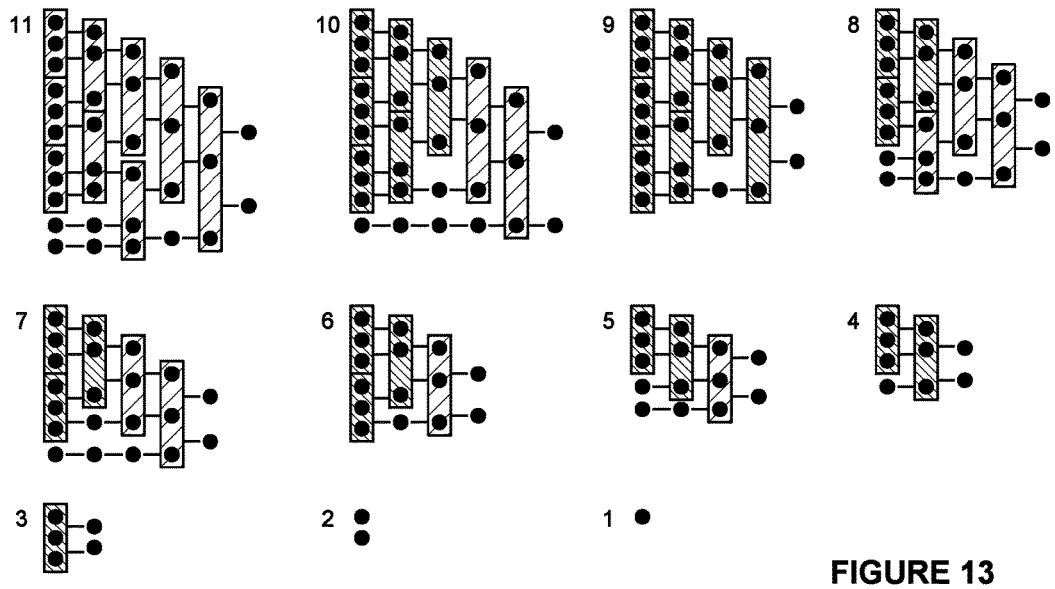
FIG. 13 illustrates exemplary logical arrangements of full adders in a full adder tree.

Possible logical arrangements of the reduction cells of a full adder having a depth of order log(r) are shown in FIG. 13 (note that as a physical circuit, the reduction cells need not be set out as in FIG. 13 since, as described below, some reduction cells may be shared between full adders). Such adder arrangements have the advantage that they can reduce a greater number of rows at each level of the tree and so exhibit greater parallelisation. It will be appreciated that the principles of FIG. 13 can be extended to larger numbers of rows.

FIG. 13 illustrates exemplary full adders of logarithmic depth for input bit portions of x ranging from the case in which the bit portion is of a length which splits into 11 rows down to the trivial case in which the bit portion is of a length which splits into only three rows that require a single reduction stage (marked '3' in the Figure). Each of the reductions shown in FIG. 13 is a full adder relating to a different value of i in equation 7 above and hence a different bit selection from the input x.

Each full adder is marked in the figure by the number of rows of n-bits in the input bit portion. Each of the inputs to the full adders therefore differs by n-bits in accordance with equation 7. Each node in the figure represents an n-bit row, with the rows carrying the most significant bits at the top and the least significant bits at the bottom of the vertical representations of the rows. The most significant rows may be reduced first. Each full adder example in FIG. 13 shows groups of 3 rows being reduced down to 2 rows by a reduction cell. The bit portions of x which are of a length that comprise 1 or 2 rows do not require reduction, as is shown in FIG. 13.

In FIG. 13, the more rows comprising more significant bits are reduced first until the number of rows are reduced down to 2. At each reduction stage one or more of the least significant rows are left out when the number of rows is not an integer multiple of 3. Other arrangements of reduction cells having the same depth are possible (e.g. starting with the rows comprising the least significant bits).

The result of the modulo operation $x[j,k] \bmod(2^n-1)$ is the sum of the outputs of the full adders each configured to reduce a bit selections of x for a given i in equation 7. In other words, if the longest bit selection is of length r, then the reductions of the bit selections ranging from length r down to 1 are summed together to give the output of the modulo operation. For example, if n=2 and the longest bit selection from x is 22 bits, then the greatest number of rows to be reduced at a full adder is and the output of the modulo operation may be calculated by summing the outputs of the 11 full adders shown in the example of FIG. 13.

Many of the reduction cells belonging to different full adders can be shared, with the total number of reduction cells being required to produce all the necessary modulo signals to calculate the division slices being of the order of r*log(r). The reduction cells which can be shared between different full adders because they operate on the same set of input bits of x are shaded in FIG. 13. In this example, the functions of the 45 reduction cells shown in the figure can actually be performed by only 18 reduction cells if, in the design of the binary logic circuit, the full adders are configured to share reduction cells between full adders.

The full adder tree approach to performing division according to the principles described herein of reducing the division operation to a set of modulo calculations may be further extended to division of the form:

$$\left\lfloor \frac{p*x+r}{q} \right\rfloor \tag{21}$$

For integer p,r and odd integer q (unrelated to the p,q,r used above). This is because there will exist integers a and b where:

$a*q = 2^b - 1$

Such that:

$$\left\lfloor \frac{p*x+r}{q} \right\rfloor = \left\lfloor \frac{z}{2^b - 1} \right\rfloor \tag{22}$$

Where $z=(a*p)*x+(a*r)$. Replacing x with z and n with b in equations 7 and 8 or 9 and 10 above therefore enables more complex division to be similarly reduced to a set of modulo operations and hence benefit from analogous improvements in speed and chip area consumption. Using the principles described herein in such a general case is especially useful in saving chip area in comparison to conventional multiply-add schemes which tend to produce arrays having excessive repetition of logic operations.

It will be appreciated that the full adder tree approach may be extended to divisors of the form $d=2^n+1$, as well as to division operations on signed inputs x.

In the case $d=2^n-1$ when the input x is signed, it is sufficient to consider only whether the most significant bit is signed. This can be achieved by calculating $(-2^{w-1} \mod 2^n-1)=2^n-1-(2^{w-1} \mod 2^n-1)=2^n-2^{(w-1)mod\ n}-1$ rather than $(2^{w-1} \mod 2^n-1)=2^{(w-1)mod\ n}$. Where $-2^{w-1}$ is the value of the sign bit, which is the most significant bit in the signed input x. This is equivalent to left-appending the sign bit to the most significant n-bit row (e.g. if the sign bit is 0, fill the remaining significant bits in the n-bit row with zeros; if the sign bit is 1, fill the remaining significant bits with ones) and, subsequent to the reduction operation on the group of most significant rows, decrementing the output of that reduction by 1 to form a modified output for use in subsequent reduction stages. This decrement increases the delay/area compared to the unsigned case but is an efficient way of handling the signed case and no exception logic is required, even for the case wmod n=0. This approach ensures that the appropriate sign bit is provided as the most significant bit of the output div.

The decrementing of each row by the sign bit may be deferred to the modulo slice or div slice calculation stage. This approach can introduce the overhead that the decrement must be performed for each slice and hence the slice logic may become more complex. However, the timing characteristics of the slice logic may potentially be improved since the decrement could be merged in with the addition(s) required to calculate each slice of div.

An alternative approach to handling signed inputs may be to treat the input x as unsigned and to negate the value of the sign bit from the calculated div. For example, the value of the sign-bit $$\left\lfloor \frac{2^w}{d} \right\rfloor$$

may be negated from div and (if present) $2^w \mod d$ may be subtracted from the modulo output.

Figure 14:
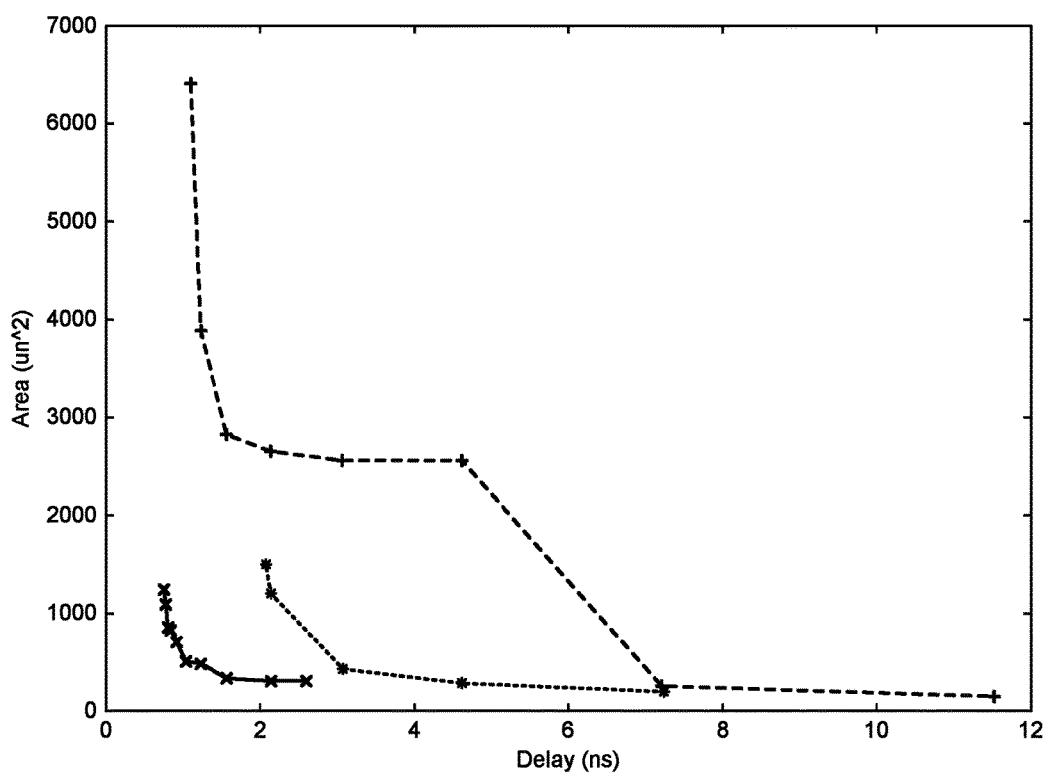
FIG. 14 compares plots of area versus delay for a conventional circuit and binary logic circuit configured according to the principles described herein and using one-hot encodings of modulo operations.
Figure 15:
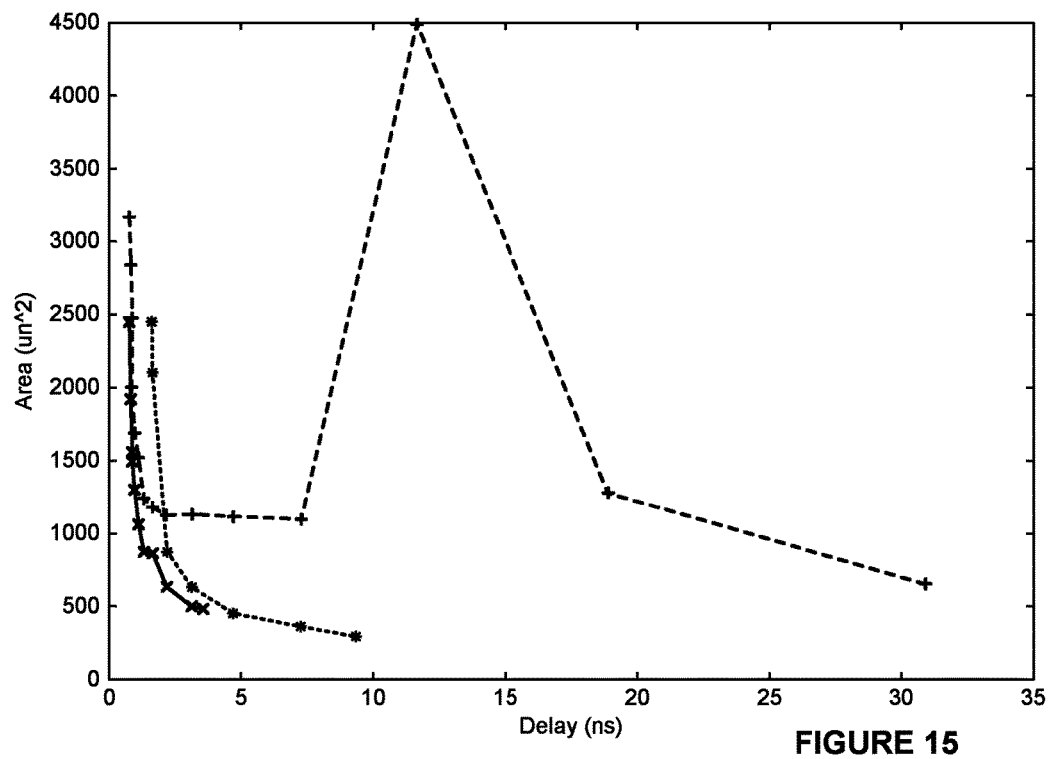
FIG. 15 compares plots of area versus delay for a conventional circuit and binary logic circuit configured according to the principles described herein and using binary encodings of modulo operations.
Figure 16:
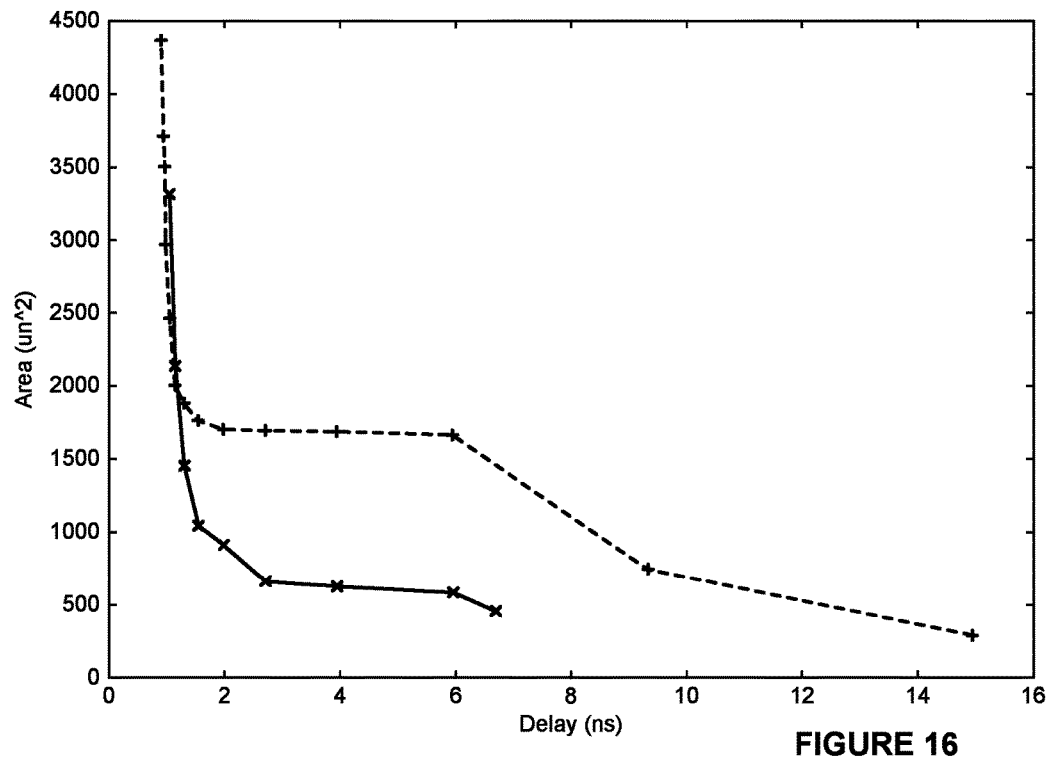
FIG. 16 compares plots of area versus delay for a conventional circuit and a binary logic circuit configured according to the principles described herein and using full adders to perform modulo operations.

FIGS. 14 to 16 show plots of area versus delay for binary logic circuits configured to calculate the ratio $div=x/(2^n-1)$ according to the principles described herein compared to conventional architectures generated by synthesis software. In can be seen from the plots that the proposed binary logic circuits offer substantial improvements in terms of speed and area over conventional circuits.

For unsigned x for the case w=64 and d=3, FIG. 14 compares the area versus delay for a conventional circuit (red line) to binary circuits configured according to the one-hot encoding described herein which are optimised for speed (green line; logarithmic depth logic tree) and area (blue line; linear depth logic tree).

For unsigned x for the case w=64 and d=255, FIG. 15 compares the area versus delay for a conventional circuit (red line) to binary circuits configured to evaluate the ratio in a slice-wise manner according to equations 7 and 8 but using a conventional binary encoding of values rather than the one-hot encoding of the example above. In the figure, the green line relates to a binary circuit having combination logic in the form of a logic tree of logarithmic depth and is hence optimised for speed, and the blue line relates to a binary circuit having combination logic in the form of a logic tree of linear depth and is hence optimised for area.

For unsigned x for the case w=48 and d=21, FIG. 16 compares the area versus delay for a conventional circuit (red line) to a binary circuit configured according to the full adder example described herein (green line).

$d=2^n+1$ case

A variant of the full adder reduction explained above with reference to FIGS. 9 and 10 will now be described for the case $d=2^n+1$, where x is an unsigned m-bit integer $x[m-1:0]$ on which RNI division by $d=2^n+1$ is performed so as to produce unsigned integers $$div[m-n-1:0] = \left\lfloor \frac{x}{2^n+1} \right\rfloor$$

and modulo[n:0]=x mod $(2^n+1)$.

For simplicity in the following explanation, m is arranged to be a multiple of n with m=t*n and t>2. Thus $$m = \left\lceil \frac{w}{n} \right\rceil.$$

This can be achieved by appending '0's to the left of x appropriately. It will be appreciated that in practice a binary logic circuit need not append such zeros and may be configured to deal with bit strings of differing lengths in any suitable manner. The cases in which t=1,2 may be trivially derived from the more general case described below.

The following approach may be taken to performing division by $d=2^n+1$ at slice logic 510. Note that the values set out below are logical values and neither the values themselves nor the described arrangements of the values need physically exist at the full adders of a suitably adapted full adder tree.

The principle is to calculate all values of the following form for i=0, . . . , t-1:

$$\text{partial\_mod}(m-1,i*n)=x[m-1:i*n]\mod (2^n+1)$$

These values represent the output of modulo calculations performed on part of x and which can be combined to form the output div and modulo values. These values may be calculated at groups of one or more full adders in a full adder tree 905 at slice logic 510 of a binary logic circuit. Each full adder could be, for example, a full adder 100 or 200 as described above with respect to FIGS. 1 and 2. Note that for i=0, partial_mod(m-1,0)=modulo[n:0].

For the case i=t-1:

$$\text{partial\_mod}(m-1:(t-1)*n)=x[m-1:(t-1)*n]$$

since $$x[m-1:(t-1)*n]\epsilon[0,2^n-1]$$

and so $$x[m-1:(t-1)*n]=x[m-1:(t-1)*n]\mod(2^n+1) \text{ trivially.}$$

For the case i=t-2:

$$\text{partial\_mod}(m-1:(t-2)*n) = x[m-1:(t-2)*n]\mod(2^n+1) =$$
$$(x[m-1:(t-1)*n]*2^n + x[(t-1)*n-1:(t-2)*n])\mod(2^n+1) =$$

-continued $$(x[(t-1)*n-1:(t-2)*n] - x[m-1:(t-1)*n]) \bmod (2^n + 1)$$

This subtraction, modulo $2^n+1$, is equal to partial_mod (m−1:(t−2)*n). The subtraction value can be anywhere in the range $[-2^n+1, 2^n-1]$. If the subtraction is 0 or positive, then:

$$x[(t-1)*n-1:(t-2)*n]-x[m-1:(t-1)*n]=\text{partial\_mod}(m-1:(t-2)*n).$$

If the subtraction is negative then:

$$x[(t-1)*n-1:(t-2)*n]-x[m-1:(t-1)*n]+(2^n+1)=\text{partial\_mod}(m-1:(t-2)*n).$$

Both $x[(t-1)*n-1:(t-2)*n]-x[m-1:(t-1)*n]$ and $x[(t-1)*n-1:(t-2)*n]-x[m-1:(t-1)*n]+(2^n+1)$ can be advantageously calculated concurrently according to the principles of a compound adder as described above with reference to FIG. 2. However, the required value would be chosen at the MUX 206 dependant on the sign of $x[(t-1)*n-1:(t-2)*n]-x[m-1:(t-1)*n]$ rather than the value of the carry bit 207.

For $0 \le i < (t-2)$:

$$\text{partial\_mod}(m-1:i*n) = (x[m-1:i*n] \bmod (2^n+1)) =$$
$$(x[m-1:(t-1)*n]*2^{(t-1-i)*n} + x[(t-1)*n-1:(t-2)*n]*2^{(t-2-i)*n} +$$
$$\ldots + x[(i+2)*n-1:(i+1)*n]*2^n + x[(i+1)*n-1:i*n])$$
$$\bmod (2^n+1) = (x[m-1:(t-1)*n]*(-1)^{(t-1-i)} +$$
$$x[(t-1)*n-1:(t-2)*n]*(-1)^{(t-2-i)} +$$
$$\ldots + x[(i+2)*n-1:(i+1)*n]*(-1) +$$
$$x[(i+1)*n-1:i*n]) \bmod (2^n+1)$$

These calculations can be done efficiently using a full adder tree 905 configured to reduce rows of bits of x at independent 'signed' full adders down to 2 n-bit rows. The configuration and 'signing' of full adders is described below.

In a similar manner to that shown in FIG. 10, x is split into t groups of adjacent n bits:

$$x[m-1:(t-1)*n], x[(t-1)*n-1:(t-2)*n], \ldots, x[2*n-1:n], x[n-1:0]$$

Each of the t groups of bits logically represents a row in a full adder of the full adder tree 905. Each full adder receives three rows for reduction down to two rows. In the present example, the rows are arranged in order of the significance of the bits comprised in each row—e.g. one can think of the row comprising the most significant bit values at the top, followed by the second most significant and so on until the least significant. This is the same arrangement as described in relation to FIG. 10. Other arrangements are possible.

A "signed" full adder described herein operates on 3 adjacent rows so as to reduce those rows down to 2 rows in the general manner shown in FIG. 10 but modified according to the following rules:

1. The t rows of x are allocated alternating signs (when the rows are arranged in order of their bit significance in x).
2. If the full adder operates on a group of 3 rows comprising 2 positive rows and 1 negative row, the carry bit at the $n^{th}$ column (e.g. 1009 in FIG. 10) is logically negated and wrapped around to the $0^{th}$ column so as to produce a positive row and a negative row whose sum minus 1 is identical to the original sum of the 3 rows (taking into account signs and modulo $(2^n+1)$).
3. If the full adder operates on a group of 3 rows comprising 1 positive row and 2 negative rows, the carry bit at the $n^{th}$ column (e.g. 1009 in FIG. 10) is logically negated and wrapped around to the $0^{th}$ column so as to produce a positive row and a negative row whose sum plus 1 is identical to the original sum of the 3 rows (taking into account signs and modulo $(2^n+1)$).
4. For each partial_mod calculation for which t−i is even, the sign of the two output rows are swapped when calculating the modulo value from the values of the two output rows. This requires no additional logic since, for a given design where t is known, the sign of the output rows may be interpreted as appropriate within the circuit.
5. For each partial_mod calculation for which t−i is odd, a −1 correction is added to the two output rows when calculating the modulo value.

It is advantageous to fix the sign of the most significant row of bits of x across each of the partial_mod calculations performed on the bit selections $x[m-1:i*n]$. This straightforwardly allows the outputs of the full adders to be shared because the same reductions are being performed in respect of different partial_mod calculations.

The set of rows of alternating sign representing x can be reduced to 2 rows of different signs (the final pair of rows are always positive and negative) using n independent 'signed' full adders. A simple modification of the logic of the full adder tree 905 is required to perform the logical negation of each carry bit.

The alternating sum modulo $(2^n+1)$ evaluated by a full adder is equal to partial_mod(m−1:i*n).

As each 'signed' full adder operates on the bit columns (see FIG. 10), the full adder takes 2-bits of one sign and 1-bit of the other sign and produces a carry-bit of the same sign as the 2-bits inputted, and a sum bit of the other. This can be expressed as follows. Let 1-bit inputs a,b have the same sign and c the opposite sign. A 'signed' full adder performs the same logic as a non-signed reduction cell described above:

sum=a XOR b XOR c

But the carry bit is given by:

carry=(a AND b) OR (b AND not(c)) OR (not(c) AND a)

This differs from a non-signed full adder in that the input c is logically negated in the carry output.

Thus a full adder having logic to add together the values of n bit columns can be used to convert 3 rows with sign +,−,+ to a pair of bit rows of sign +,− with a positive carry-bit in the $n^{th}$ column and a gap in the positive row in the $0^{th}$ column, or to convert 3 rows with signs −,+,− to a pair of bit rows of sign −,+ with a negative carry in the $n^{th}$ column and a gap in the negative row in the $0^{th}$ column.

The structure of the 'signed' full adder tree may be identical to the $d=2^n-1$ case, where it is possible to have a logarithmic depth tree with more nodes or a linear depth tree with fewer nodes. For example, the logarithmic depth tree structure shown in FIG. 13 for the $d=2^n-1$ case where x has 11 rows can also be used here to show how the outputs of 'signed' full adders can be shared for each value of $0 \le i < (t-2)$. This is because the logic doesn't change when we introduce signs to the rows in the manner described, just the way we interpret the input and outputs. This can be appreciated by replacing the dots shown in FIG. 13 with alternating +'s and −'s for each row diagram and following them through to the final 2 row outputs according to the above rules.

The values of partial_mod(m−1:i*n) for 0≤i<t can be used to calculate (t−1) n-bit division slices of div[(i+1)*n−1:i*n] in the following way:

From above, $$div[m-n-1:i*n] = \left\lfloor \frac{x[m-1:i*n]}{2^n+1} \right\rfloor$$

and so:

$$div[(i+1)*n-1:i*n] =$$

$$(div[m-n-1:i*n]) \bmod 2^n = \left\lfloor \frac{x[m-1:i*n]}{2^n+1} \right\rfloor \bmod 2^n =$$

$$\left\lfloor \frac{2^n * x[m-1:(i+1)*n] + x[(i+1)*n-1:i*n]}{2^n+1} \right\rfloor \bmod 2^n =$$

$$\left\lfloor \frac{2^n * \left( (2^n+1) * \left\lfloor \frac{x[m-1:(i+1)*n]}{2^n+1} \right\rfloor + (x[m-1:(i+1)*n] \bmod (2^n+1)) \right) + x[(i+1)*n-1:i*n]}{2^n+1} \right\rfloor \bmod 2^n =$$

$$\left\lfloor \frac{2^n * \left\lfloor \frac{x[m-1:(i+1)*n]}{2^n+1} \right\rfloor + (2^n * (x[m-1:(i+1)*n] \bmod (2^n+1))) + x[(i+1)*n-1:i*n]}{2^n+1} \right\rfloor \bmod 2^n =$$

$$\bmod 2^n = \left( 2^n * \left\lfloor \frac{x[m-1:(i+1)*n]}{2^n+1} \right\rfloor + \left\lfloor \frac{2^n * (x[m-1:(i+1)*n] \bmod (2^n+1)) + x[(i+1)*n-1:i*n]}{2^n+1} \right\rfloor \right) \bmod 2^n =$$

$$\left\lfloor \frac{2^n * (x[m-1:(i+1)*n] \bmod (2^n+1)) + x[(i+1)*n-1:i*n]}{2^n+1} \right\rfloor \bmod 2^n =$$

$$\left\lfloor \frac{2^n * (x[m-1:(i+1)*n] \bmod (2^n+1)) + x[(i+1)*n-1:i*n]}{2^n+1} \right\rfloor =$$

$$\left\lfloor \frac{(2^n+1) * (x[m-1:(i+1)*n] \bmod (2^n+1)) - (x[m-1:(i+1)*n] \bmod (2^n+1))}{2^n+1} + \frac{x[(i+1)*n-1:i*n]}{2^n+1} \right\rfloor =$$

$$\left\lfloor (x[m-1:(i+1)*n] \bmod (2^n+1)) + \frac{x[(i+1)*n-1:i*n] - (x[m-1:(i+1)*n] \bmod (2^n+1))}{2^n+1} \right\rfloor =$$

$$(x[m-1:(i+1)*n] \bmod (2^n+1)) + \left\lfloor \frac{x[(i+1)*n-1:i*n] - (x[m-1:(i+1)*n] \bmod (2^n+1))}{(2^n+1)} \right\rfloor =$$

-continued $$\text{partial\_mod}(m-1:(i+1)*n) + \left\lfloor \frac{x[(i+1)*n-1:i*n] - \text{partial\_mod}(m-1:(i+1)*n)}{2^n+1} \right\rfloor =$$

$$(x[(i+1)*n-1:i*n] - \text{partial\_mod}(m-1:(i+1)*n)) \geq 0 ? \text{partial\_mod}(m-1:(i+1)*n)$$

$$: \text{partial\_mod}(m-1:(i+1)*n) - 1$$

This final ternary statement can be calculated by performing the following sum(i) value (where the '&' symbol stands for concatenation of binary numbers) and then right-shifting the result by n:

$$\text{sum}(i) = (\text{partial\_mod}(m-1:(i+1)*n) \& (x[(i+1)*n-1:i*n])) - \text{partial\_mod}(m-1:(i+1)*n) =$$

$$(2^n - 1) * \text{partial\_mod}(m-1:(i+1)*n) + x[(i+1)*n-1:i*n]$$

$$div[(i+1)*n-1:i*n] = \left\lfloor \frac{\text{sum}(i)}{2^n} \right\rfloor = \text{sum}(i) \gg n$$

This works because (x[(i+1)*n−1:i*n] partial$_{mod}$(m−1:(i+1)*n))ϵ[−$2^n$, $2^n$−1] can be represented by a signed (n+1) bit number. The sign-bit is in the $n^{th}$ column (measuring the least significant as 0), so if its value is negative, the sign-bit will cause a decrement of partial$_{mod}$(m−1:(i+1)*n) in the top n-bits and if positive or zero, the sign-bit will have no effect on the top n-bits. Thus, right-shifting the bottom n-bits away leaves partial$_{mod}$(m−1:(i+1)*n)−1 or partial$_{mod}$(m−1:(i+1)*n) dependant on the signage of (x[(i+1)*n−1:i*n] partial_mod(m−1:(i+1)*n)) as required.

Let a[n−1:0] be the final 'signed' full adder row reduced positive row and b[n−1:0] be the negative row. We have:

$$\text{partial\_mod}(m-1:i*n) = \begin{cases} (a-b) \bmod (2^n+1) & \text{for } (t-i) \text{ even} \\ (a-b-1) \bmod (2^n+1) & \text{for } (t-i) \text{ odd} \end{cases}$$

Since both (a−b)ϵ[−$2^n$+1,$2^n$−1] and (a−b−1)ϵ[−$2^n$,$2^n$−2] can be represented by (n+1)-bit signed numbers, a similar compound adder setup to that explained above with reference to FIG. 2 can be used to calculate partial_mod(m−1:i*n) from a[n−1:0] and b[n−1:0], given the t and i constant values.

In this manner, and with limited modification in order to introduce the signing of rows in the full adders, perform logical negation of carry bits and form of the above sum, division by $2^n$+1 may be performed at the slice logic of a binary logic circuit as described herein with reference to the figures.

A particular example will now be given of the calculations which may be performed by a binary logic circuit comprising a compound full adder tree configured to perform division by d=$2^3$+1=9 in the manner described above. In this example, x is an unsigned 16-bit integer (x[15:0]) and the outputs of the binary logic circuit are the unsigned integers $$div[12:0] = \left\lfloor \frac{x}{2^3+1} \right\rfloor \text{ and } modulo[3:0] = x \bmod (2^3+1).$$

Let the input be x="1001010100110111"=38199. We then expect the outputs div[12:0]="1000010010100"=4244 and modulo[3:0]="0011"=3.

Firstly, append 2 constant '0's to the most significant bits of x to make it 18 (divisible by 3) rather than 16 bits in length. This gives us $$t = \frac{18}{3} = 6$$

rows, which are, starting with the most significant:

x[17:15]="001"

x[14:12]="001"

x[11:9]="010"

x[8:6]="100"

x[5:3]="110"

x[2:0]="111"

Note that a binary logic circuit configured to operate on an input of length 16 may or may not append 2 zeros as has been done here to simplify the example. Typically, and as will be appreciated by a person skilled in the art of binary logic circuit design, the hardware circuit would not be designed so as to require additional inputs in order to minimise circuit area and complexity.

Firstly, when i=5 or 4 a full adder is not required since no reduction is necessary.

The case i=5 is the first three bits of x:

partial_mod(17:15)=x[17:15]="001"

Since modulo $2^3+1$ values in general lie in the range [0,8], for simplicity this value may be expressed as a 4-bit value as "0001" for consistency with the other partial_mod values.

Addition logic may be provided at the slice logic to perform the case i=4:

$$\text{partial\_mod}(17{:}12) = (x[14{:}12] - x[17{:}15]) \bmod (2^3 + 1)$$

$$= (\text{``}001\text{''} - \text{``}001\text{''}) \bmod (2^3 + 1)$$

Since "001"–"001"≥0 then no correctional addition of $2^3+1$ is required so partial_mod(17:12)="001"–"001"="0000".

'Signed' full adders may be used to evaluate partial_mod for i=3,2,1,0:

When i=3:

partial_mod(17:9)=(−"010"+"101"−1)≥0?(−"010"+"101"−1):(−"010"+"101"−1+"1001")="0010"

Which as a full adder reduction of 3 rows down to 2 rows can be expressed as:

$$\left.\begin{array}{l}+\text{``}001\text{''}\\-\text{``}001\text{''}\\+\text{``}010\text{''}\end{array}\right\} \begin{array}{l}-\text{``}010\text{''}\\+\text{``}101\text{''}\end{array}$$
$$\rightarrow$$

Which requires one full adder and one stage. Note the addition of −1 because t−i is odd. Note also that the most significant row is allocated a positive sign and this sign is maintained for this row for subsequent i so as to allow subsequent partial_mod calculations to use the outputs of full adders arranged to calculate partial_mod for lower i.

When i=2:

partial_mod(17:6) = (−"011" + "101") ≥

0 ?(−"011" + "101"):(−"011" + "101" + "1001") = "0010"

$$\left.\begin{array}{l}+\text{``}001\text{''}\\-\text{``}001\text{''}\\+\text{``}010\text{''}\end{array}\right\} \begin{array}{l}-\text{``}010\text{''}\\\rightarrow +\text{``}101\text{''}\\-\text{``}100\text{''}\text{ Remainder}-\text{``}100\text{''}\end{array}\right\} \begin{array}{l}+\text{``}011\text{''}\\-\text{``}101\text{''}\end{array}$$
$$\rightarrow$$

Which requires two full adders and two stages. Each arrow represents a reduction by a full adder of the signed rows. Rows which are not subject to the reduction pass onto the next stage as a remainder row. Note the signs of the two output rows are swapped because t−i is even.

When i=1:

partial_mod(17:3) = (−"000" + "101" − 1) ≥ 0 ?(−"000" + "101" − 1)

:(−"000" + "101" − 1 + "1001") = "0100"

$$\left.\begin{array}{l}+\text{``}001\text{''}\\-\text{``}001\text{''}\\+\text{``}010\text{''}\\-\text{``}100\text{''}\text{ Remainder}-\text{``}100\text{''}\\+\text{``}110\text{''}\text{ Remainder}+\text{``}110\text{''}\text{ Remainder}+\text{``}110\text{''}\end{array}\right\} \begin{array}{l}-\text{``}010\text{''}\\\rightarrow +\text{``}101\text{''}\\\rightarrow -\text{``}101\text{''}\end{array}\right\} \begin{array}{l}+\text{``}011\text{''}\\-\text{``}101\text{''}\\\rightarrow -\text{``}000\text{''}\\+\text{``}101\text{''}\end{array}$$

Which requires three full adders and three stages. Note the addition of −1 because t−i is odd.

When i=0:

partial_mod(17:0)=(−"010"+"101")≥0?(−"010"+"101"):(−"010"+"101"+"1001")
="0011"=3=modulo[3:0]

as expected for this example input.

$$\left.\begin{array}{l}+\text{``}001\text{''}\\-\text{``}001\text{''}\\+\text{``}010\text{''}\\-\text{``}100\text{''}\\+\text{``}110\text{''}\\-\text{``}111\text{''}\end{array}\right\} \begin{array}{l}-\text{``}010\text{''}\\\rightarrow +\text{``}101\text{''}\\+\text{``}101\text{''}\\\rightarrow -\text{``}010\text{''}\text{ Remainder}\end{array}\right\} \begin{array}{l}-\text{``}010\text{''}\\+\text{``}010\text{''}\\-\text{``}010\text{''}\end{array}\right\} \begin{array}{l}+\text{``}010\text{''}\\-\text{``}101\text{''}\end{array}$$

Which requires four full adders and three stages. Note the signs of the two output rows are swapped because t−i is even.

The total number of full adders indicated above is 10. However, there are only 6 unique sets of input rows and it is therefore possible to configure the full adder tree within which the full adders are comprised to share the results between full adders such that only 6 full adders are required. This is advantageous since it minimises circuit area and complexity.

Since t=6, an even number, t−i is even when i is even. Thus the two output rows for the cases t=2 and 4 should have their signs to be swapped (rule 4 above). The output rows for the cases i=1 and 3 require a minus 1 correction when calculating the partial_mod values below (rule 5 above).

The calculation of the (t−1)=5 div slices can now be performed given these values of partial_mod:

$$div[14:12] = \left\lfloor \frac{(\text{partial\_mod}(17:15) \,\&\,(x[14:12])) - \text{partial\_mod}(17:15)}{2^3} \right\rfloor =$$

$$\left\lfloor \frac{\text{``0001001''} - \text{``0001''}}{2^3} \right\rfloor = \text{``0001000''} >> 3 = \text{``001''}$$

$$div[11:9] = \left\lfloor \frac{(\text{partial\_mod}(17:12) \,\&\,(x[11:9])) - \text{partial\_mod}(17:12)}{2^3} \right\rfloor =$$

$$\left\lfloor \frac{\text{``0000010''} - \text{``0000''}}{2^3} \right\rfloor = \text{``0000010''} >> 3 = \text{``000''}$$

$$div[8:6] = \left\lfloor \frac{(\text{partial\_mod}(17:9) \,\&\,(x[8:6])) - \text{partial\_mod}(17:9)}{2^3} \right\rfloor =$$

$$\left\lfloor \frac{\text{``0010100''} - \text{``0010''}}{2^3} \right\rfloor = \text{``0010010''} >> 3 = \text{``010''}$$

$$div[5:3] = \left\lfloor \frac{(\text{partial\_mod}(17:6) \,\&\,(x[5:3])) - \text{partial\_mod}(17:6)}{2^3} \right\rfloor =$$

$$\left\lfloor \frac{\text{``0010110''} - \text{``0010''}}{2^3} \right\rfloor = \text{``0010100''} >> 3 = \text{``010''}$$

$$div[2:0] = \left\lfloor \frac{(\text{partial\_mod}(17:3) \,\&\,(x[2:0])) - \text{partial\_mod}(17:3)}{2^3} \right\rfloor =$$

$$\left\lfloor \frac{\text{``0100111''} - \text{``0100''}}{2^3} \right\rfloor = \text{``0100011''} >> 3 = \text{``100''}$$

Appropriately concatenating all of these together we have:

div[14:12]&div[11:9]&div[8:6]&div[5 3]&div[2:0]
="001000010010100"

Due to the length of the input x being 16, the length of the div output will be 12 after division by $2^3+1$. The top two bits of this concatenation can therefore be removed which were guaranteed to be zeros due to the initial appending of two zeros to the top of x to make its length divisible by 3. Note that the initial appending of zeros to x is to aid ease of explanation and it is preferred that a binary logic circuit does waste additional logic on their presence.
Doing this, we finally get:

div[12:0]="1000010010100"=4244 as expected for this example input.

Typically, integrated circuits are initially designed using software (e.g. Synopsys(R) Design Compiler) that generates a logical abstraction of the desired integrated circuit. Such an abstraction is generally termed register-transfer level or RTL. Once the logical operation of the integrated circuit has been defined, this can be used by synthesis software (e.g. Synopsys(R) IC Compiler) to create representations of the physical integrated circuit. Such representations can be defined in high level hardware description languages, for example Verilog or VHDL and, ultimately, according to a gate-level description of the integrated circuit. Where logic for calculating a division operation $$div = \frac{x}{d}$$

is required, design software may be configured to use logic configured according to the principles described herein. This could be achieved, for example, by introducing into the integrated circuit design register transfer level (RTL) code defining a binary logic circuit according to any of the examples described herein and shown in the figures.

The binary logic circuits illustrated in the figures are shown as comprising a number of functional blocks. This is schematic only and is not intended to define a strict division between different logic elements of such entities. Each functional block may be provided in any suitable manner. It is to be understood that intermediate values described herein as being formed by components of a binary logic circuit need not be physically generated by the binary logic circuit at any point and may merely represent logical values which conveniently describe the processing performed by the binary logic circuit between its input and output.

Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, byte-code, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture a binary logic circuit configured to perform any of the methods described herein, or to manufacture a binary logic circuit comprising any apparatus described herein. An integrated circuit definition dataset may be, for example, an integrated circuit description.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS (RTM) and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a binary logic circuit will now be described with respect to FIG. 11.

Figure 11:
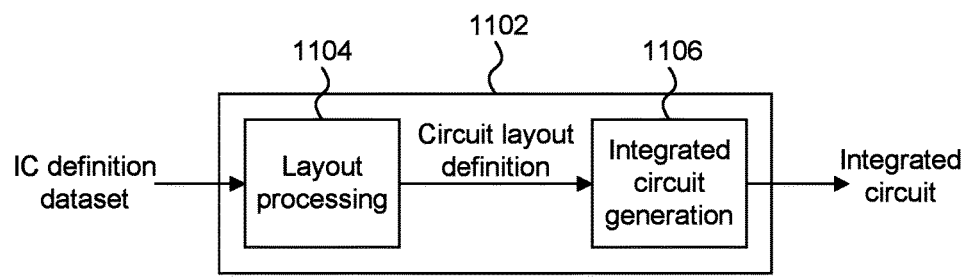
FIG. 11 is a schematic diagram of an integrated circuit manufacturing system.

FIG. 11 shows an example of an integrated circuit (IC) manufacturing system 1102 which comprises a layout processing system 1104 and an integrated circuit generation system 1106. The IC manufacturing system 1102 is configured to receive an IC definition dataset (e.g. defining a binary logic circuit as described in any of the examples herein), process the IC definition dataset, and generate an IC according to the IC definition dataset (e.g. which embodies a binary logic circuit as described in any of the examples herein). The processing of the IC definition dataset configures the IC manufacturing system 1102 to manufacture an integrated circuit embodying a binary logic circuit as described in any of the examples herein.

The layout processing system 1104 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1104 has determined the circuit layout it may output a circuit layout definition to the IC generation system 1106. A circuit layout definition may be, for example, a circuit layout description.

The IC generation system 1106 generates an IC according to the circuit layout definition, as is known in the art. For example, the IC generation system 1106 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1106 may be in the form of computer-readable code which the IC generation system 1106 can use to form a suitable mask for use in generating an IC.

The different processes performed by the IC manufacturing system 1102 may be implemented all in one location, e.g. by one party. Alternatively, the IC manufacturing system 1102 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a binary logic circuit without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 11 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 11, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

The invention claimed is:

1. A binary logic circuit configured to determine the ratio x/d in accordance with a rounding scheme, where x is a variable integer input of bit length w and d is a fixed positive integer of the form $2^n \pm 1$, the binary logic circuit comprising:
   fixed function hardware logic configured to form the ratio as a plurality of bit slices, the bit slices collectively representing the ratio;
   fixed function hardware logic configured to generate each bit slice according to a first modulo operation for calculating mod $(2^n \pm 1)$ of a respective bit selection of the input x and in dependence on a check for a carry bit, the fixed function hardware logic configured to generate each bit slice being in communication with the fixed function hardware logic configured to form the ratio; and
   fixed function hardware logic configured to, responsive to the check, selectively combine a carry bit with the result of the first modulo operation, the fixed function hardware logic configured to selectively combine a carry bit with the result of the first modulo operation being in communication with the fixed function hardware logic configured to generate each bit slice.

2. A binary logic circuit as claimed in claim 1, wherein the fixed function hardware logic configured to generate each bit slice i of the ratio is configured to perform the first modulo operation $x[w-1:n*(i+1)]\mod(2^n-1)$, where i lies in the range 0 to $$\left\lceil \frac{w}{n} \right\rceil - 1.$$

3. A binary logic circuit as claimed in claim 2, wherein the fixed function hardware logic configured to, for each bit slice i, perform the check for a carry bit is configured to perform the check by:
   in the case $d=2^n-1$, returning a carry bit of 1 for combination with the result of the first modulo operation when:

$x[w-1:n*(i+1)]\mod(2^n-1)+x[n*(i+1)-1:n*i] \geq 2^n 31\ 1$ or
   in the case $d=2^n+1$, returning a carry bit of $-1$ for combination with the result of the first modulo operation when:

$-x[w-1:n*(i+1)]\mod(2^n+1)+x[n*(i+1)-1:n*i] \geq 0$.

4. A binary logic circuit as claimed in claim 1, wherein the binary logic circuit comprises a plurality of modulo logic units each configured to perform a first modulo operation on a different respective bit selection of the input x so as to generate a set of modulo outputs.

5. A binary logic circuit as claimed in claim 4, wherein the binary logic circuit comprises combination logic configured to combine the set of modulo outputs so as to generate the bit slices of the ratio.

6. A binary logic circuit as claimed in claim 4, wherein the modulo outputs are d-bit one-hot encodings and the binary logic circuit comprises an adder tree configured to determine the result of one or more of the first modulo operations by combining the results of first modulo operations on shorter bit selections from x to form the results of first modulo operations on longer bit selections from x, the binary logic circuit not including logic to evaluate those first modulo operations on longer bit selections from x.

7. A binary logic circuit as claimed in claim 1, wherein, in the case $d=2^n-1$, the binary logic circuit comprises a plurality of full adders each configured to perform, for a given bit slice i, the first modulo operation $x[w-1:n(i+1)]\mod(2^n-1)$ and each full adder comprising:
   reduction logic configured to reduce the respective bit selection of the input x to a sum of a first n-bit integer $\beta$ and a second n-bit integer $\gamma$; and
   addition logic configured to calculate an addition output represented by the n least significant bits of the following sum right-shifted by n:
      a first binary value of length 2n, the n most significant bits and the n least significant bits each being the string of bit values represented by $\beta$;
      a second binary value of length 2n, the n most significant bits and the n least significant bits each being the string of bit values represented by $\gamma$; and
      the binary value 1.

8. A binary logic circuit as claimed in claim 7, wherein the reduction logic is configured to interpret the bit selection of x: as a sum of n-bit rows x', each row representing n consecutive bits of the bit selection of x such that each bit of the bit selection of x contributes to only one row and all of the bits of x are allocated to a row, and the reduction logic is configured to reduce the sum of such n-bit rows x' in a series of reduction steps so as to generate the sum of the first n-bit integer $\beta$ and the second n-bit integer $\gamma$, wherein each reduction step comprises summing a plurality of the n-bit rows of x' so as to generate a sum of one or more fewer n-bit rows.

9. A binary logic circuit as claimed in claim 8, wherein the reduction logic is configured to, on a reduction step generating a carry bit for a row at binary position n+1, use the carry bit as the least significant bit of the row.

10. A binary logic circuit as claimed in claim 8, the reduction logic comprising a plurality of reduction cells configured to operate in parallel on the rows of x' at each reduction step and a plurality of reduction stages coupled together in series, each reduction stage comprising one or more of the reduction cells configured to operate in parallel so as to perform a reduction step.

11. A binary logic circuit as claimed in claim 10, the length of the bit selection from input x for bit i slice $v_i$ being and the reduction logic comprising at least $$\left\lfloor \left\lceil \frac{v_i}{n} \right\rceil / 3 \right\rfloor$$

reduction cells each operating on a different set of three rows of x' such that, at each reduction step, the number of rows is reduced by approximately a third.

12. A binary logic circuit as claimed in claim 10, the reduction logic being configured to iteratively operate the one or more reduction cells over the rows of x' until two rows remain which represent n-bit integers β and γ.

13. A binary logic circuit as claimed in claim 7, further comprising:
   exception logic configured to form a determination result indicating whether all of the bits of the bit selection of x are 1; and
   output logic configured to operate on the addition output in dependence on the determination result received from the exception logic;
   wherein the output logic is configured to, if the determination result indicates that all of the bits of the bit selection of x are 1, perform a XOR operation of the addition output with the binary value 1.

14. A binary logic circuit as claimed in claim 13, the exception logic being configured to form a determination result of 1 if all of the bits of the bit selection of x are 1 and a determination result of 0 if not all of the bits of the bit selection of x are 1, and the output logic comprising a XOR gate configured to receive the addition output and determination result as its inputs so as to form as its output the result of the first modulo operation.

15. A binary logic circuit as claimed in claim 7, the addition logic comprising a compound adder configured to concurrently form a first sum β+γ and a second sum β+γ+1, and to provide the sums to a multiplexer configured to select between the first and second sums in dependence on whether the second sum generates a carry bit; the addition output of the multiplexer being the second sum if a carry bit is generated and the first sum if a carry bit is not generated.

16. A binary logic circuit as claimed in claim 7, the addition logic comprising an adder configured to calculate the sum of the first and second binary values and 1, and the addition logic being configured to provide the n least significant bits of the sum right-shifted by n as the addition output.

17. A binary logic circuit as claimed in claim 1, wherein, in the case $d=2^n+1$, the binary logic circuit comprises groups of one or more full adders, each group configured to perform, for a given bit slice i, the first modulo operation $x[m-1:i*n] \mod(2^n+1)$ where $$m = \lceil \frac{w}{n} \rceil,$$

each full adder of a group comprising:
   reduction logic configured to reduce a set of three adjacent input bit strings of length n to a set of two output bit strings of length n, the bit strings being assigned alternating signs such that the adjacent bit strings have opposite signs and in dependence on a first bit string comprising the least significant bits of x being assigned a positive sign;
   carry logic configured to logically negate a carry bit generated at position n by the reduction logic and include the carry bit at an empty position 0 in the set of two output bit strings; and
   addition logic configured to:
      if the three input bit strings include two positive bit strings and one negative bit string, add binary minus 1 to the output bit strings; and
      if the three input bit strings include two positive bit strings and one negative bit string, add binary plus 1 to the output bit strings.

18. A method for determining the ratio x/d in a binary logic circuit in accordance with a rounding scheme, where x is a variable integer input of bit length w and d is a fixed positive integer of the form $2^n+1$, the method comprising:
   forming each of a plurality of bit slices of the ratio by:
      performing, by fixed function hardware logic, a first modulo operation for calculating $\mod(2^n+1)$ of a respective bit selection of the input x;
      checking, by fixed function hardware logic, for a carry bit of the first modulo operation; and
      responsive to the check, selectively combining, by fixed function hardware logic, the carry bit with the result of the first modulo operation; and
   combining the bit slices to form the complete ratio.

19. A method as claimed in claim 18, wherein the performing a first modulo operation comprises:
   reducing the bit selection of x to a sum of a first n-bit integer β and a second n-bit integer γ;
   at least partially calculating a result for the sum of:
      a first binary value of length 2n, the n most significant bits and the n least significant bits each being the string of bit values represented by β;
      a second binary value of length 2n, the n most significant bits and the n least significant bits each being the string of bit values represented by γ; and
      the binary value 1;
   and
   using the n least significant bits of the result right-shifted by n as the result of the first modulo operation.

20. A non-transitory computer readable storage medium having stored thereon a computer readable description of an integrated circuit that, when processed in an integrated circuit manufacturing system, causes the integrated circuit manufacturing system to manufacture a fixed function binary logic circuit for determining the ratio x/d in accordance with a rounding scheme, where x is a variable integer input of bit length w and d is a fixed positive integer of the form $2^n+1$, the binary logic circuit comprising fixed function hardware logic configured to form the ratio as a plurality of bit slices, the bit slices collectively representing the ratio, fixed function hardware logic configured to generate each bit slice according to a first modulo operation for calculating $\mod(2^n+1)$ of a respective bit selection of the input x and in dependence on a check for a carry bit, and fixed function hardware logic configured to, responsive to the check, selectively combine a carry bit with the result of the first modulo operation.

* * * * *